US012720363B2

(12) United States Patent
Fujishiro et al.

(10) Patent No.: US 12,720,363 B2
(45) Date of Patent: Aug. 25, 2026

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 303 days.

(21) Appl. No.: 18/502,969

(22) Filed: Nov. 6, 2023

(65) Prior Publication Data

US 2024/0073736 A1 Feb. 29, 2024

Related U.S. Application Data

(63) Continuation of application No. PCT/JP2022/019528, filed on May 2, 2022.

(60) Provisional application No. 63/185,648, filed on May 7, 2021.

(51) Int. Cl.

| | |
|---|---|
| ***H04W 28/02*** | (2009.01) |
| ***H04W 16/26*** | (2009.01) |
| ***H04W 36/30*** | (2009.01) |
| ***H04W 36/36*** | (2009.01) |
| ***H04W 40/22*** | (2009.01) |
| ***H04W 72/04*** | (2023.01) |
| *H04W 36/00* | (2009.01) |
| *H04W 36/08* | (2009.01) |

(52) U.S. Cl.

CPC ....... *H04W 28/0278* (2013.01); *H04W 16/26* (2013.01); *H04W 36/305* (2018.08); *H04W 36/362* (2023.05); *H04W 40/22* (2013.01); *H04W 72/04* (2013.01); *H04W 36/0069* (2018.08); *H04W 36/087* (2023.05)

(58) Field of Classification Search

CPC ............ H04W 36/305; H04W 36/362; H04W 36/087; H04W 36/0069; H04W 40/22; H04W 72/04; H04W 28/0278

See application file for complete search history.

(56) References Cited

FOREIGN PATENT DOCUMENTS

WO WO-2020164591 A1 * 8/2020 ............ H04W 24/10

OTHER PUBLICATIONS

3rd Generation Partnership Project; Technical Specification Group Radio Access Network; NR; NR and NG-RAN Overall Description; Stage 2 (Release 16); 3GPP TS 38.300 V16.5.0; Mar. 2021; pp. 1-151.

* cited by examiner

*Primary Examiner* — Matthew E Heneghan

(74) *Attorney, Agent, or Firm* — Studebaker Brackett PLLC

(57) ABSTRACT

In a first aspect, a communication control method is used in a cellular communication system. The communication control method includes configuring, by a donor node including a first relay node and a second relay node being a parent node of the first relay node, the first relay node using correspondence information representing a correspondence relationship between a hop count of a logical channel (LCH) and a logical channel group (LCG), the first relay node and the second relay node being subordinate to the donor node. The communication control method includes transmitting, by the first relay node, a buffer status report (BSR) to the second relay node, based on the correspondence information. The communication control method further includes transmitting, by the second relay node, an uplink grant (UL grant) to the first relay node, based on the correspondence information and the buffer status report.

5 Claims, 22 Drawing Sheets

Short 4bit

| $LCG_{15}$ | $LCG_{14}$ | $LCG_{13}$ | $LCG_{12}$ | $LCG_{11}$ | $LCG_{10}$ | $LCG_{9}$ | $LCG_{8}$ |
|---|---|---|---|---|---|---|---|
| $LCG_{7}$ | $LCG_{6}$ | $LCG_{5}$ | $LCG_{4}$ | $LCG_{3}$ | $LCG_{2}$ | $LCG_{1}$ | $LCG_{0}$ |
| BS 1 | | | | | | | |
| BS 2 | | | | | | | |
| ... | | | | | | | |
| BS m | | | | | | | |

Long 4bit

Short 8bit

| $LCG_{255}$ | $LCG_{254}$ | $LCG_{253}$ | $LCG_{252}$ | $LCG_{251}$ | $LCG_{250}$ | $LCG_{249}$ | $LCG_{248}$ |
|---|---|---|---|---|---|---|---|

...

| $LCG_{15}$ | $LCG_{14}$ | $LCG_{13}$ | $LCG_{12}$ | $LCG_{11}$ | $LCG_{10}$ | $LCG_{9}$ | $LCG_{8}$ |
|---|---|---|---|---|---|---|---|
| $LCG_{7}$ | $LCG_{6}$ | $LCG_{5}$ | $LCG_{4}$ | $LCG_{3}$ | $LCG_{2}$ | $LCG_{1}$ | $LCG_{0}$ |

BS 1

BS 2

...

BS m

Long 8bit

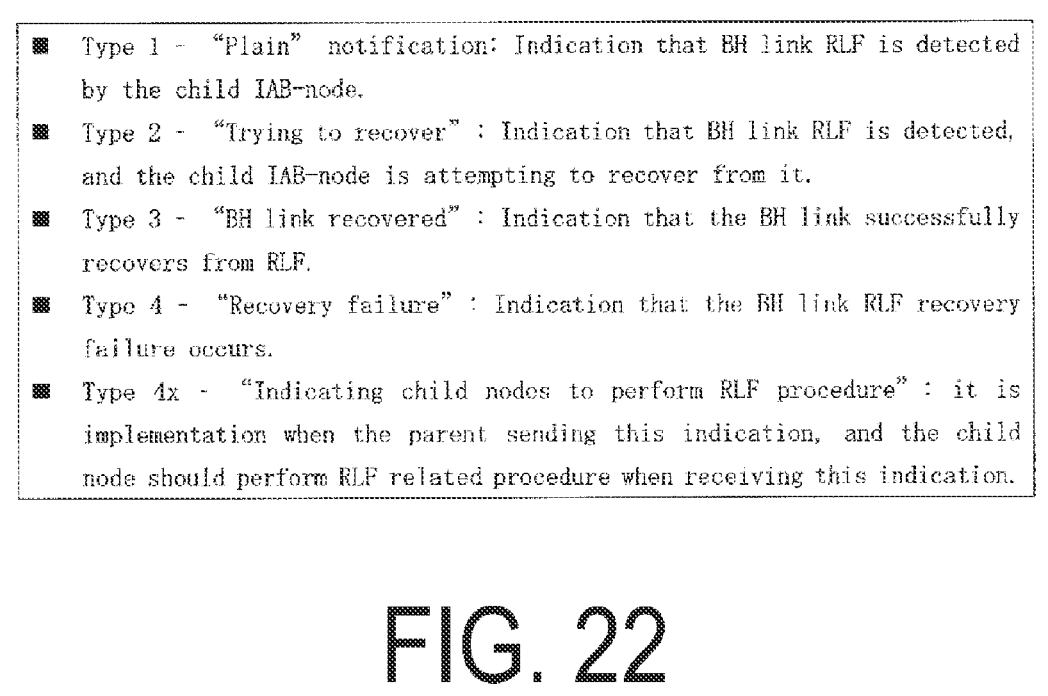

- Type 1 - “Plain” notification: Indication that BH link RLF is detected by the child IAB-node.
- Type 2 - “Trying to recover” : Indication that BH link RLF is detected, and the child IAB-node is attempting to recover from it.
- Type 3 - “BH link recovered” : Indication that the BH link successfully recovers from RLF.
- Type 4 - “Recovery failure” : Indication that the BH link RLF recovery failure occurs.
- Type 4x - “Indicating child nodes to perform RLF procedure” : it is implementation when the parent sending this indication, and the child node should perform RLF related procedure when receiving this indication.

FIG. 22

COMMUNICATION CONTROL METHOD

RELATED APPLICATIONS

The present application is a continuation based on PCT Application No. PCT/JP2022/019528, filed on May 2, 2022, which claims the benefit of US Provisional Patent Application No. 63/185,648 filed on May 7, 2021. The content of which is incorporated by reference herein in their entirety.

TECHNICAL FIELD

The present disclosure relates to a communication control method used in a cellular communication system.

BACKGROUND OF INVENTION

In the Third Generation Partnership Project (3GPP), which is a project for the standardization of cellular communication systems, introducing a new relay node referred to as an Integrated Access and Backhaul (IAB) node (for example, see "3GPP TS 38.300 V16.5.0(2021-03)") is being considered. One or more relay nodes are involved in communication between a base station and a user equipment and perform relay for the communication.

SUMMARY

In a first aspect, a communication control method is used in a cellular communication system. The communication control method includes configuring, by a donor base station including a first relay node and a second relay node being a parent node of the first relay node, the first relay node using correspondence information representing a correspondence relationship between a hop count of a logical channel (LCH) and a logical channel group (LCG), the first relay node and the second relay node being subordinate to the donor base station. The communication control method includes transmitting, by the first relay node, a buffer status report (BSR) to the second relay node, based on the correspondence information. The communication control method further includes transmitting, by the second relay node, an uplink grant (UL grant) to the first relay node, based on the correspondence information and the buffer status report.

In a second aspect, a communication control method is used in a cellular communication system. The communication control method includes configuring, by an upper node of a first relay node, the first relay node using a configuration value relating to a logical channel group. The communication control method includes determining, by the first relay node, a MAC control element (CE) format corresponding to the configuration value. The communication control method further includes transmitting, by the first relay node, a buffer status report to a second relay node being a parent node of the first relay node, using the MAC control element format.

In a third aspect, a communication control method is used in a cellular communication system. The communication control method includes configuring, by an upper node of a first relay node, the first relay node using an integrated buffer status report. The communication control method includes transmitting, by the first relay node to a second relay node being a parent node of the first relay node, the integrated buffer status report storing buffer sizes corresponding to logical channel groups classified for each type of the buffer status report, the integrated buffer status report being transmitted in accordance with the configuring.

In a fourth aspect, a communication control method is used in a cellular communication system. The communication control method includes configuring, by a donor base station including a first relay node and a second relay node being a parent node of the first relay node, the first relay node using local rerouting and conditional handover (CHO), the first relay node and the second relay node being subordinate to the donor base station. The communication control method includes receiving, by the first relay node from the second relay node, a failure recovery notification indicating that an attempt is being made to recover from a failure having occurred in a backhaul link between the second relay node and a parent node of the second relay node. The communication control method further includes performing, by the first relay node, the local rerouting or the conditional handover in response to reception of the failure recovery notification.

BRIEF DESCRIPTION OF THE DRAWINGS

FIG. 22 is a diagram illustrating types of BH RLF notifications.

DESCRIPTION OF EMBODIMENTS

A cellular communication system in an embodiment is described with reference to the drawings. In the description of the drawings, the same or similar parts are denoted by the same or similar reference signs.

Configuration of Cellular Communication System

First, a configuration example of the cellular communication system in an embodiment is described. In an embodiment, a cellular communication system is a 3GPP 5G system. Specifically, a radio access scheme in the cellular communication system 1 is New Radio (NR) being a 5G radio access scheme. Note that Long Term Evolution (LTE) may be at least partially applied to the cellular communication system. A future cellular communication system such as the 6G may be applied to the cellular communication system 1.

Figure 1:
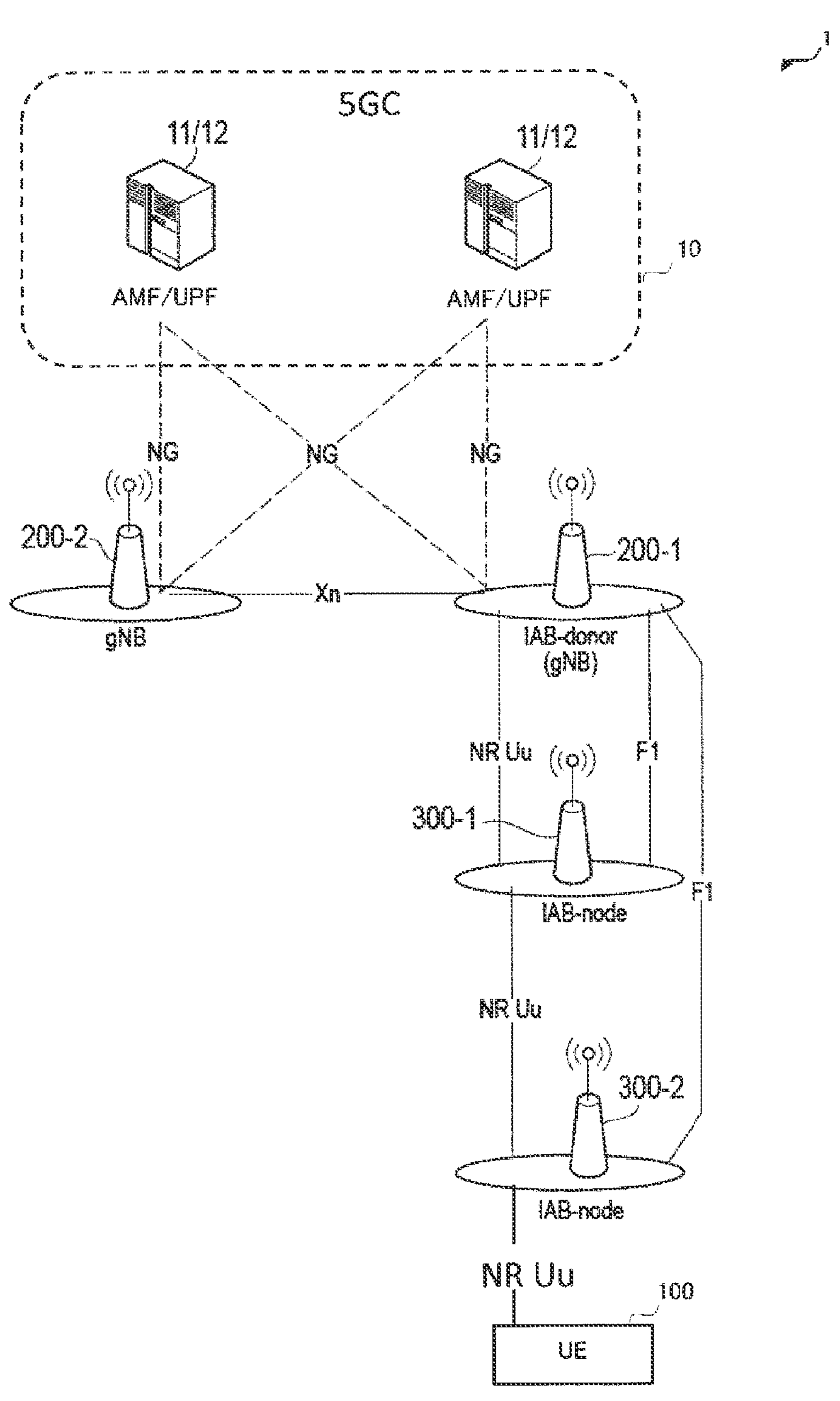
FIG. 1 is a diagram illustrating a configuration example of a cellular communication system according to an embodiment.

FIG. 1 is a diagram illustrating a configuration example of the cellular communication system 1 according to an embodiment.

As illustrated in FIG. 1, the cellular communication system 1 includes a 5G core network (5GC) 10, a User Equipment (UE) 100, base station apparatuses (hereinafter, also referred to as base stations in some cases) 200-1 and 200-2, and IAB nodes 300-1 and 300-2. The base station 200 may be referred to as a gNB.

An example in which the base station 200 is an NR base station is mainly described below, but the base station 200 may also be an LTE base station (i.e., an eNB).

Note that hereinafter, the base stations 200-1 and 200-2 may be referred to as a gNB 200 (or the base station 200 in some cases), and the IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. Hereinafter, a "cell" may be used without being distinguished from a base station such as the gNB 200. One cell belongs to one carrier frequency.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU and includes an F1-C protocol that is a control plane protocol and an F1-U protocol that is a user plane protocol. The cellular communication system 1 supports an IAB that uses NR for the backhaul to enable wireless relay of the NR access. The donor gNB (or the donor node, hereinafter also referred to as the "donor node" in some cases) 200-1 is a donor base station that is a terminal node of the NR backhaul on the network side and includes additional functionality for supporting the IAB. The backhaul can implement multi-hop via a plurality of hops (i.e., a plurality of IAB nodes 300).

FIG. 1 illustrates an example in which the TAB node 300-1 is wirelessly connected to the donor node 200-1, the TAB node 300-2 is wirelessly connected to the TAB node 300-1, and the F1 protocol is transmitted in two backhaul hops.

The UE 100 is a mobile wireless communication apparatus that performs wireless communication with the cells. The UE 100 may be any type of apparatus as long as the UE 100 is an apparatus that performs wireless communication with the gNB 200 or the TAB node 300. For example, the UE 100 includes a mobile phone terminal and/or a tablet terminal, a notebook PC, a sensor or an apparatus that is provided in a sensor, a vehicle or an apparatus that is provided in a vehicle, and an unmanned aerial vehicle or an apparatus provided in an unmanned aerial vehicle. The UE 100 is wirelessly connected to the TAB node 300 or the gNB 200 via an access link. FIG. 1 illustrates an example in which the UE 100 is wirelessly connected to the TAB node 300-2. The UE 100 indirectly communicates with the donor node 200-1 via the TAB node 300-2 and the TAB node 300-1.

Figure 2:
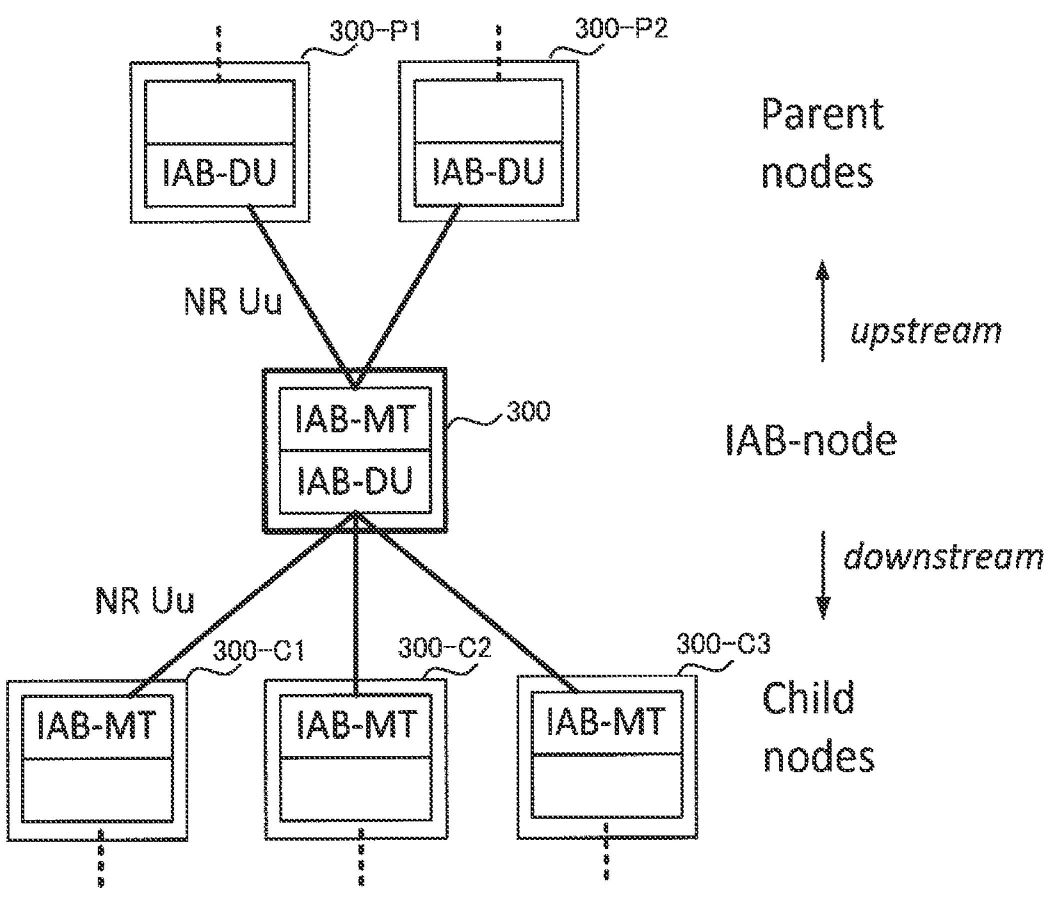
FIG. 2 is a diagram illustrating a relationship between an IAB node, Parent nodes, and Child nodes.

FIG. 2 is a diagram illustrating a relationship between the TAB node 300, parent nodes, and child nodes.

As illustrated in FIG. 2, each TAB node 300 includes an IAB-DU corresponding to a base station functional unit and an TAB-Mobile Termination (MT) corresponding to a user equipment functional unit.

Neighboring nodes of the TAB-MT (i.e., upper node) of an NR Uu wireless interface are referred to as "parent nodes". The parent node is the DU of a parent TAB node or the donor node 200. A radio link between the TAB-MT and each parent node is referred to as a backhaul link (BH link). FIG. 2 illustrates an example in which the parent nodes of the TAB node 300 are TAB nodes 300-P1 and 300-P2. Note that the direction toward the parent nodes is referred to as upstream. As viewed from the UE 100, the upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower TAB nodes. The IAB-DU supports the F1 protocol for the CU of the donor node 200-1. FIG. 2 illustrates an example in which the child nodes of the TAB node 300 are TAB nodes 300-C1 to 300-C3; however, the UE 100 may be included in the child nodes of the TAB node 300. Note that the direction toward the child nodes is referred to as downstream.

All of the TAB nodes 300 connected to the donor node 200 via one or more hops form a Directed Acyclic Graph (DAG) topology (which may be referred to as "topology"

below) rooted at the donor node 200. In this topology, the neighboring nodes of the IAB-DU in the interface are child nodes, and the neighboring nodes of the TAB-MT in the interface are parent nodes as illustrated in FIG. 2. The donor node 200 performs, for example, centralized management on resources, topology, and routes of the TAB topology. The donor node 200 is a gNB that provides network access to the UE 100 via a network of backhaul links and access links.

Configuration of Base Station

Figure 3:
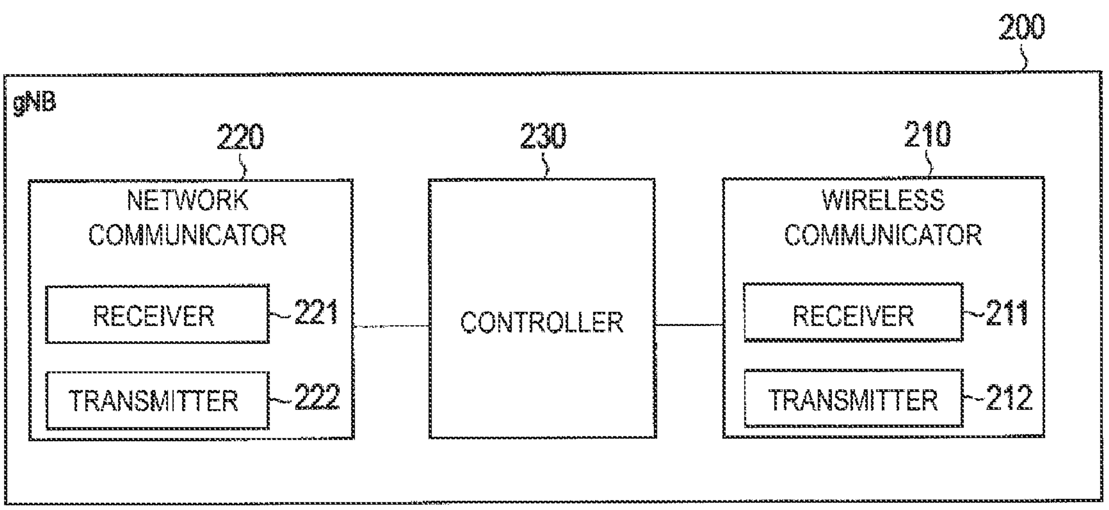
FIG. 3 is a diagram illustrating a configuration example of a gNB (base station) according to an embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna and converts (down-converts) a radio signal received by the antenna into a baseband signal (reception signal) which is then transmitted to the controller 230. The transmitter 212 performs various types of transmission under control of the controller 230. The transmitter 212 includes an antenna and converts (up-converts) the baseband signal (transmission signal) output by the controller 230 into a radio signal which is then transmitted from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from an external source and outputs the reception signal to the controller 230. The transmitter 222 performs various types of transmission under control of the controller 230. The transmitter 222 transmits the transmission signal output by the controller 230 to an external destination.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below. In each embodiment described below, the controller 230 may perform various processing operations in the gNB 200 (or the donor node 200).

Configuration of Relay Node

Figure 4:
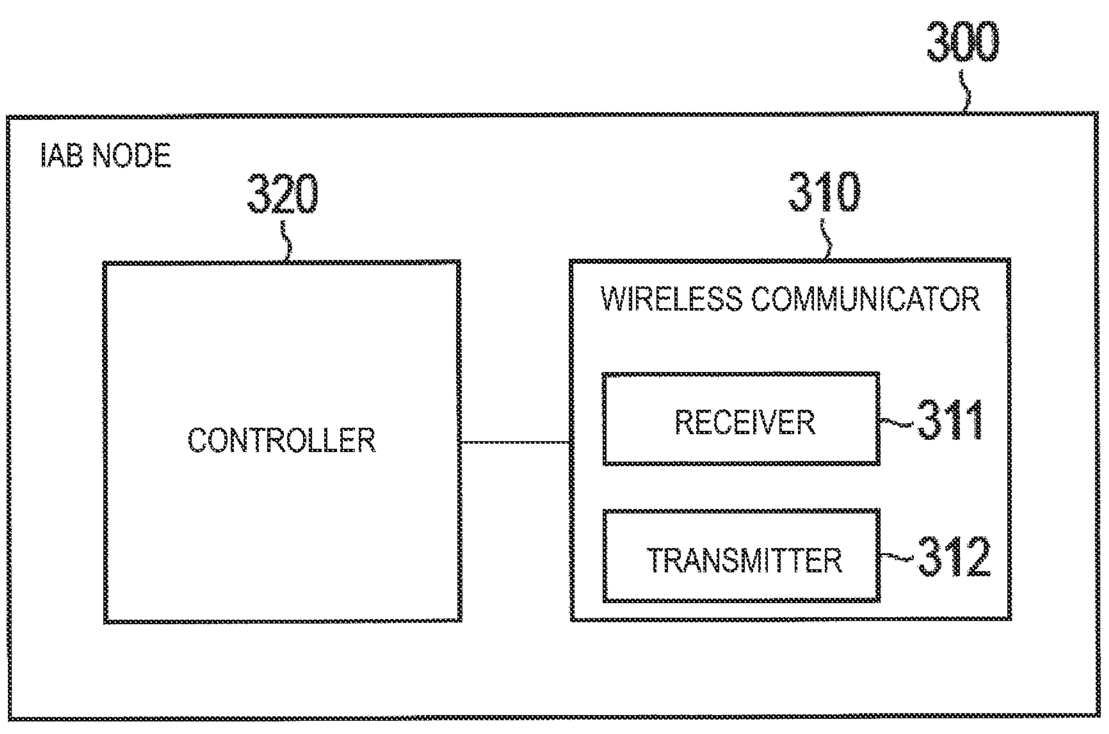
FIG. 4 is a diagram illustrating a configuration example of an IAB node (relay node) according to an embodiment.

A configuration of the IAB node 300 that is a relay node (or a relay node apparatus, which is also referred to as a relay node below in some cases) in the embodiment is described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link). The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna and converts (down-converts) a radio signal received by the antenna into a baseband signal (reception signal) which is then transmitted to the controller 320. The transmitter 312 performs various types of transmission under control of the controller 320. The transmitter 312 includes an antenna and converts (up-converts) the baseband signal (transmission signal) output by the controller 320 into a radio signal which is then transmitted from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 320 may perform various processing operations in the IAB node 300 in each embodiment described below.

Configuration of User Equipment

Figure 5:
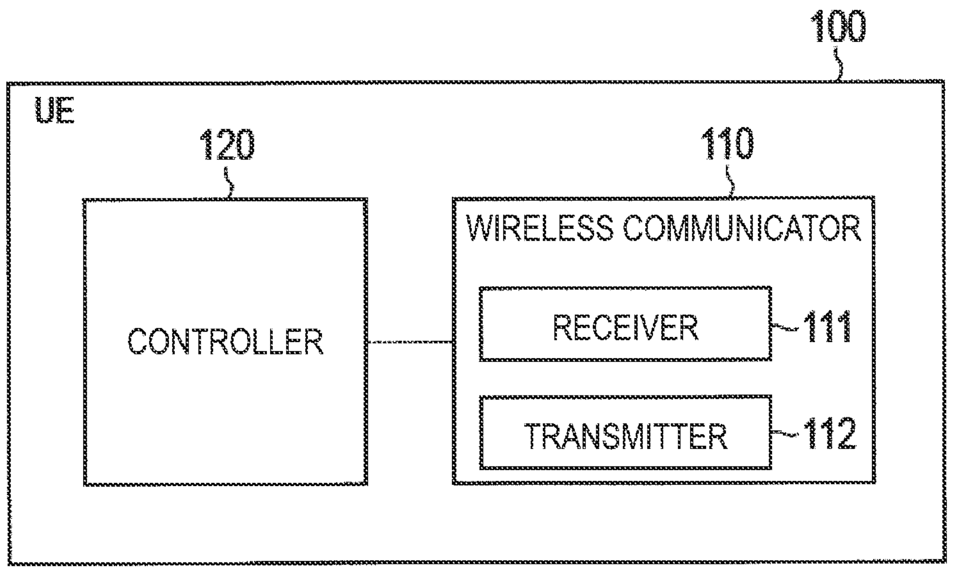
FIG. 5 is a diagram illustrating a configuration example of a UE (user equipment) according to an embodiment.

A configuration of the UE 100 that is a user equipment according to the embodiment is described next. FIG. 5 is a diagram illustrating a configuration example of the UE 100. As illustrated in FIG. 5, the UE 100 includes a wireless communicator 110 and a controller 120.

The wireless communicator 110 performs wireless communication in the access link, i.e., wireless communication with the gNB 200 and wireless communication with the IAB node 300. The wireless communicator 110 may also perform wireless communication in a sidelink, i.e., wireless communication with another UE 100. The wireless communicator 110 includes a receiver 111 and a transmitter 112. The receiver 111 performs various types of reception under control of the controller 120. The receiver 111 includes an antenna and converts (down-converts) a radio signal received by the antenna into a baseband signal (reception signal) which is then transmitted to the controller 120. The transmitter 112 performs various types of transmission under control of the controller 120. The transmitter 112 includes an antenna and converts (up-converts) the baseband signal (transmission signal) output by the controller 120 into a radio signal which is then transmitted from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 120 may perform each processing operation in the UE 100 in each embodiment described below.

Configuration of Protocol Stack

Figure 6:
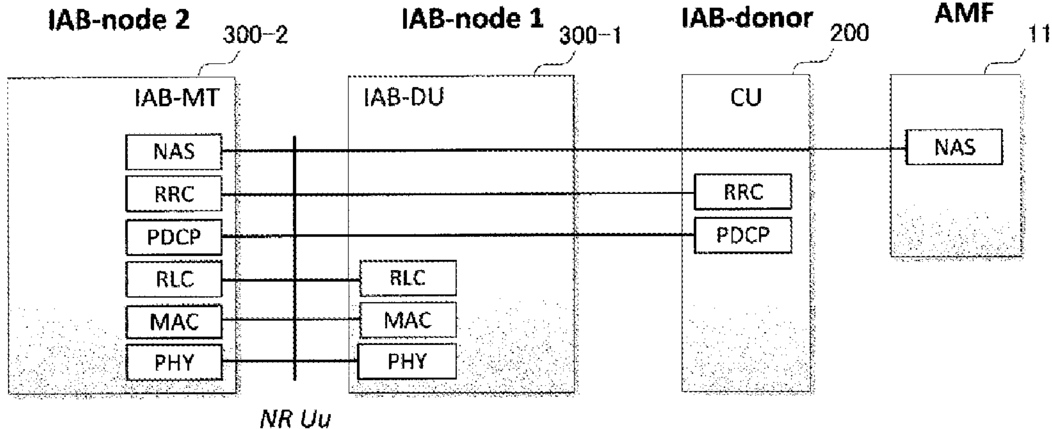
FIG. 6 is a diagram illustrating an example of a protocol stack related to an RRC connection and a NAS connection of an IAB-MT.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, Modulation and Coding Schemes (MCSs)) in the uplink and the downlink and allocation resource blocks.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the CU of the donor node 200 via a radio bearer.

The RRC layer controls a logical channel, a transport channel, and a physical channel according to establishment, re-establishment, and release of a radio bearer. RRC signaling for various configurations is transmitted between the RRC layer of the IAB-MT of the TAB node 300-2 and the RRC layer of the CU of the donor node 200. When an RRC connection to the donor node 200 is present, the IAB-MT is in an RRC connected state. When no RRC connection to the donor node 200 is present, the IAB-MT is in an RRC idle state.

The NAS layer which is positioned upper than the RRC layer performs session management, mobility management, and the like. NAS signaling is transmitted between the NAS layer of the IAB-MT of the TAB node 300-2 and the NAS layer of the AMF 11.

Figure 7:
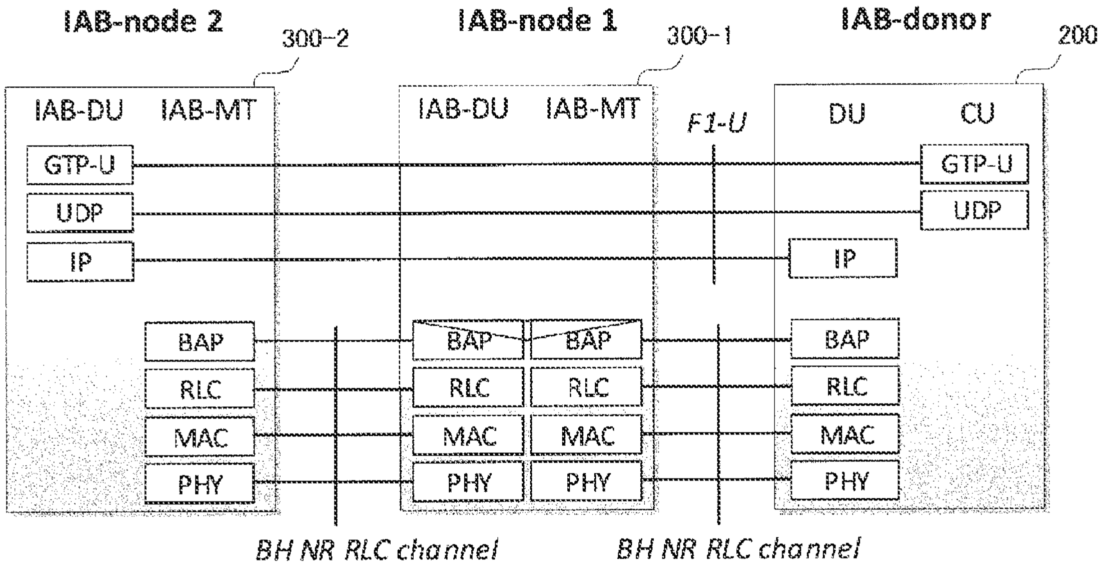
FIG. 7 is a diagram illustrating an example of a protocol stack related to an F1-U protocol.
Figure 8:
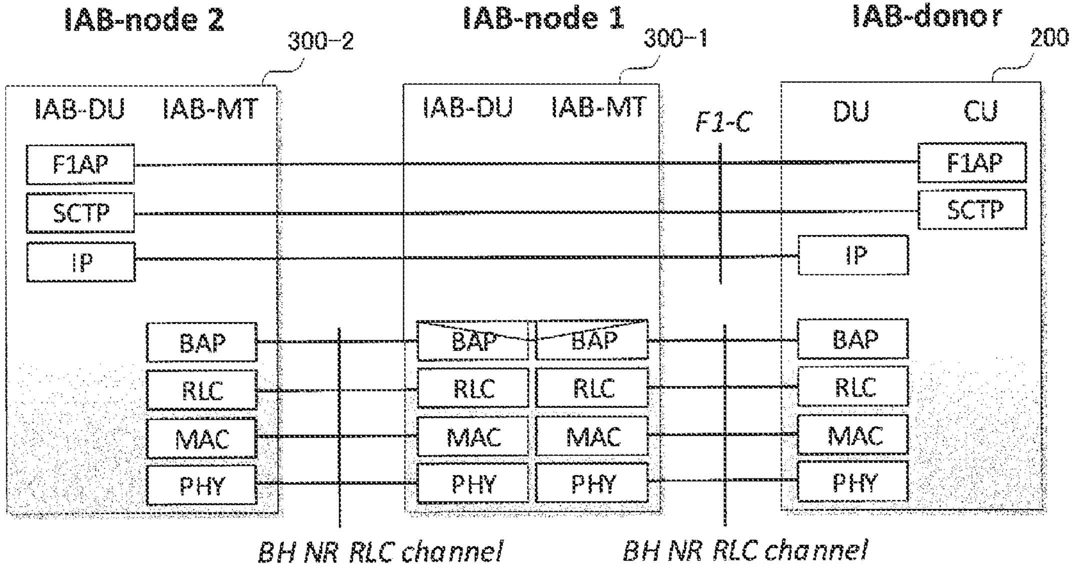
FIG. 8 is a diagram illustrating an example of a protocol stack related to an F1-C protocol. A portion A of FIG. 9 is a diagram illustrating a transmission example of a legacy BSR according to a first embodiment, and a portion B of FIG. 9 and a portion C of FIG. 9 are diagrams illustrating examples of transmission of a pre-emptive BSR according to the first embodiment.

FIG. 7 is a diagram illustrating a protocol stack related to an F1-U protocol. FIG. 8 is a diagram illustrating a protocol stack related to an F1-C protocol. An example is illustrated in which the donor node 200 is divided into a CU and a DU.

As illustrated in FIG. 7, each of the IAB-MT of the TAB node 300-2, the IAB-DU of the TAB node 300-1, the IAB-MT of the TAB node 300-1, and the DU of the donor node 200 includes a Backhaul Adaptation Protocol (BAP) layer as a higher layer of the RLC layer. The BAP layer performs routing processing, and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Configuring multiple backhaul RLC channels in each BH link enables the prioritization and Quality of Service (QoS) control of traffic. The association between the BAP PDU and the backhaul RLC channel is executed by the BAP layer of each IAB node 300 and the BAP layer of the donor node 200.

Note that the CU of the donor node 200 terminates the F1 interface to the TAB node 300 and the DU of the donor node 200. The CU of the donor node 200 is the gNB-CU function of the donor node 200. The DU of the donor node 200 hosts an TAB BAP sublayer and provides a wireless backhaul to the TAB node 300. The DU of the donor node 200 is the gNB-DU function of the donor node 200.

As illustrated in FIG. 8, the protocol stack of the F1-C protocol includes an F1AP layer and an SCTP layer instead of a GTP-U layer and a UDP layer illustrated in FIG. 7.

Note that in the description below, processing or operation performed by the IAB-DU and the IAB-MT of the TAB may be simply described as processing or operation of the "TAB". For example, in the description, transmitting, by the IAB-DU of the TAB node 300-1, a message of the BAP layer to the IAB-MT of the TAB node 300-2 is assumed to correspond to transmitting, by the TAB node 300-1, the message to the IAB node 300-2. Processing or operation of the DU or CU of the donor node 200 may be described simply as processing or operation of the "donor node".

An upstream direction and an uplink (UL) direction may be used without distinction. Further, a downstream direction and a downlink (DL) direction may be used without distinction.

First Embodiment

Now, a first embodiment will be described.

Buffer Status Report (BSR)

Generally, a BSR transmitted by the UE 100 (hereinafter referred to as the "legacy BSR" as appropriate) indicates, for each logical channel group (LCG), the amount of uplink data having yet to be transmitted by each of the MAC, RLC, and PDCP layers (that is, an uplink buffer amount). Each LCG is a group including at least one logical channel and configured by priority. Based on the legacy BSR received from the UE 100, the gNB 200 determines, for each LCG, the amount of uplink data untransmitted by the UE 100 and performs scheduling such that the UE 100 is allocated uplink radio resources commensurate with the amount of uplink data untransmitted.

Figure 9:
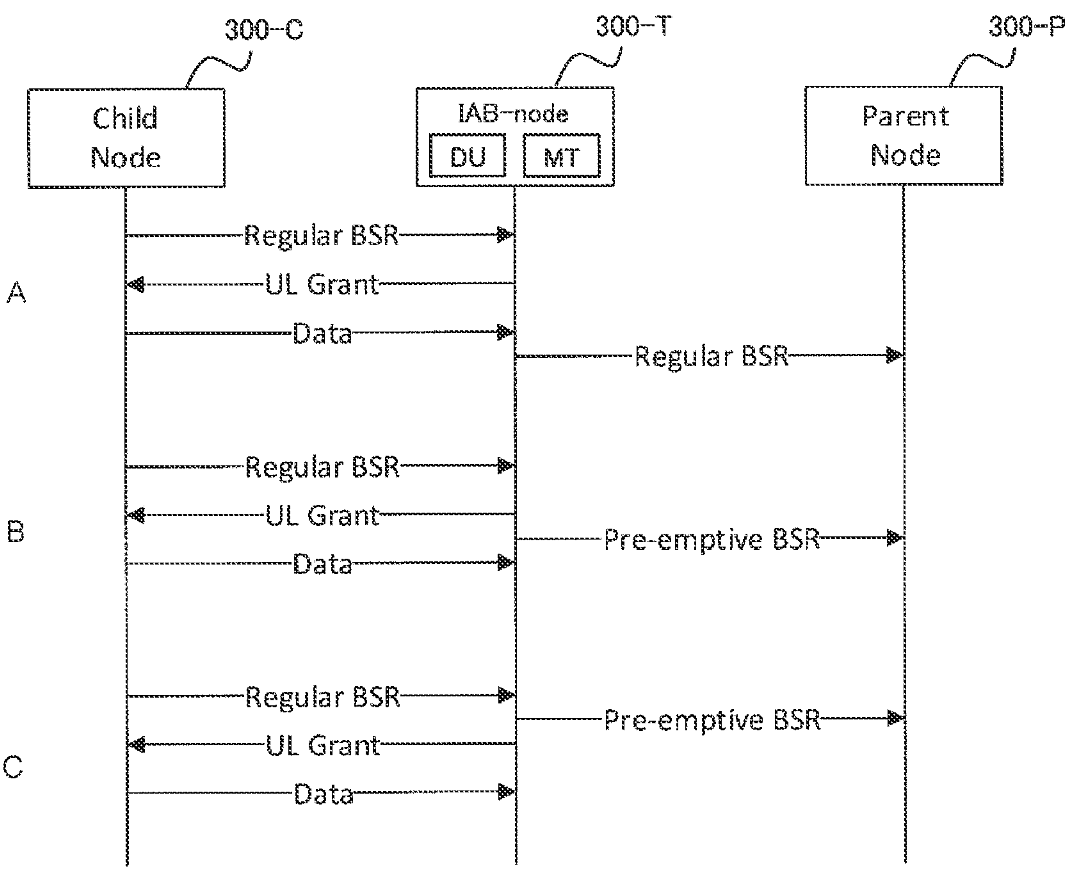

A portion A of FIG. 9 is a diagram illustrating a transmission example of the legacy BSR according to the first embodiment. Although the expression "Regular BSR" is used in the portion A of FIG. 9, "Regular BSR" may also be referred to as the legacy BSR hereinafter.

The portion A of FIG. 9 illustrates an example in which an IAB node 300-T transmits a legacy BSR to a parent node 300-P after receiving data from a child node 300-C.

As illustrated in the portion A of FIG. 9, the IAB-MT of the IAB node 300-T uses the legacy BSR to report, as a buffer size, the amount of data waiting to be transmitted (or data buffered) in the MAC and the RLC in the IAB-MT of the IAB node 300-T. The IAB-DU of the parent node 300-P allocates, to the IAB node 300-T, an uplink radio resource corresponding to the data amount. The IAB-MT of the IAB node 300-T transmits the data to the parent node 300-P by using the allocated uplink radio resource.

Portions B and C of FIG. 9 are diagrams illustrating transmission examples of pre-emptive BSRs according to the first embodiment.

As illustrated in the portion B of FIG. 9, after the IAB-DU of the IAB node 300-T transmits an uplink (UL) grant to the child node 300-C and before the IAB-DU receives UL data from the child node 300-C, the IAB-MT of the IAB node 300-T transmits the pre-emptive BSR to the parent node 300-P. As illustrated in the portion C of FIG. 9, after the IAB-DU of the IAB node 300-T receives the legacy BSR from the child node 300-C and before the IAB-DU transmits the UL grant to the child node 300-C, the IAB-MT of the IAB node 300-T transmits the pre-emptive BSR to the parent node 300-P.

In this way, the pre-emptive BSR is transmitted to the parent node 300-P at an earlier timing than the legacy BSR. Accordingly, compared with the legacy BSR, the pre-emptive BSR enables a reduction in the delay (latency) of the UL scheduling of the parent node 300-P for the IAB node 300-T.

Figure 10A:
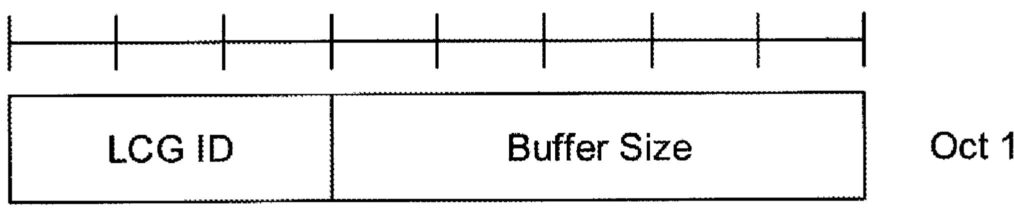
FIG. 10A is a diagram illustrating a configuration example of a MAC CE of a short BSR according to the first embodiment.

FIG. 10A is a diagram illustrating a configuration example of a MAC CE of a Short BSR according to the first embodiment (hereinafter may be referred to as a "short BSR MAC CE"). When one Logical Channel Group (LCG) includes data available for transmission, the short BSR MAC CE is used. In other words, when the buffer size of one LCG is reported, the short BSR MAC CE is used.

The short BSR MAC CE includes an "LCG ID" region and a "buffer size" region as illustrated in FIG. 10A.

The "LCG ID" region is a region in which identification information of the logical channel group for which the buffer size is reported is stored. The region length of the "LCG ID" region is 3 bits.

The "buffer size region" is a region in which the total amount of data available is stored according to a predetermined calculation procedure over all logical channels in the logical channel group after a MAC PDU has been constructed (i.e., after a logical channel prioritization procedure). The region length of the "buffer size" region is 5 bits.

Figure 10B:
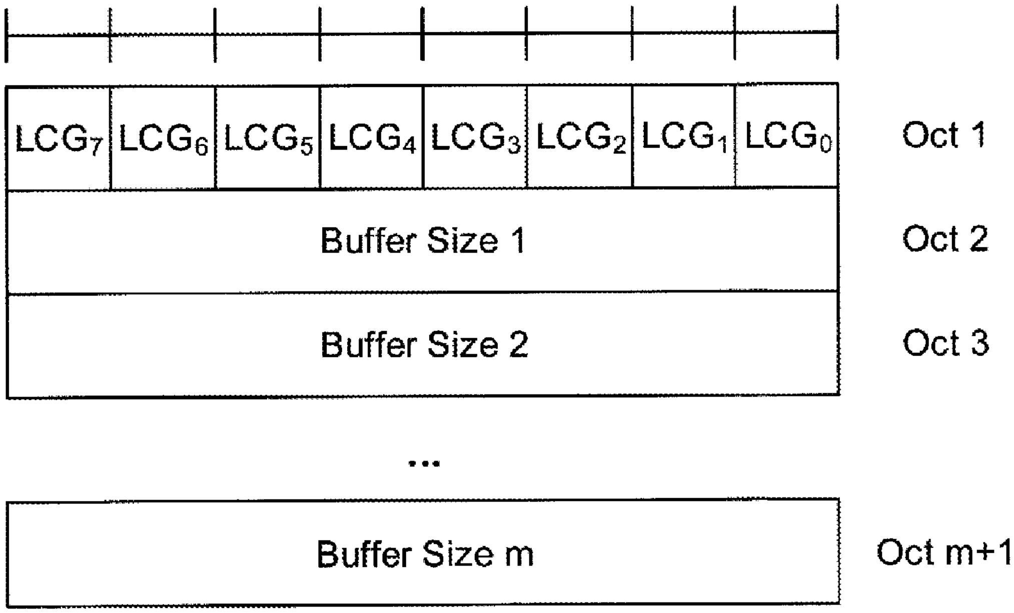
FIG. 10B is a diagram illustrating a configuration example of a MAC CE of a long BSR according to the first embodiment.

FIG. 10B is a diagram illustrating a configuration example of a MAC CE of a Long BSR (which may hereinafter be referred to as a "long BSR MAC CE") according to the first embodiment. The long BSR MAC CE is used when more than one Logical Channel Group (LCG) is present that includes data available for transmission. In other words, when the buffer size of a plurality of LCGs is reported, the long BSR MAC CE is used.

Note that FIG. 10B also illustrates a configuration example of a MAC CE of a pre-emptive BSR (which may hereinafter be referred to as a "pre-emptive BSR MAC CE").

The BSR MAC CE illustrated in FIG. 10B includes an "$LCG_i$" region and a "buffer size region".

The "$LCG_i$" region is a region indicating that a buffer size of a logical channel group i is present. In other words, $LCG_i$ configured with "1" indicates that the buffer size of the logical channel group i will be reported. On the other hand, $LCG_i$ configured with "0" indicates that the buffer size of the logical channel group i will not be reported. The region length of the "LCG i" region is 8 bits.

When the MAC CE illustrated in FIG. 10B is a long BSR MAC CE, the "buffer size" region is the same as the "buffer size" region of the short BSR MAC CE. On the other hand, when the MAC CE illustrated in FIG. 10B is a pre-emptive BSR MAC CE, a predetermined buffer size is stored in the "buffer size region". The predetermined buffer size identifies the total amount of data expected to reach the IAB-MT of the IAB node 300 (IAB node 300-T in the case of FIG. 9) for which the pre-emptive BSR has been triggered, and does not include the total amount of data currently available at the IAB-MT.

Note that the short BSR MAC CE in FIG. 10A represents the MAC CE of a short truncated BSR. The long BSR MAC CE in FIG. 10B represents the MAC CE of a long truncated BSR.

The truncated BSR is a BSR corresponding to padding bits (or padding data) inserted when the MAC layer configures the MAC PDU. When the padding bits are equal in size to the short BSR to which the subheader is added, the MAC CE in FIG. 10A is used. When the padding bits are larger in size than the short BSR to which the subheader is added, the MAC CE in FIG. 10B is used.

Note that in the following description, when the short BSR MAC CE and the short truncated BSR MAC CE are not distinguished from each other, these BSR MAC CEs may be referred to as a short BSR MAC CE for description. When the long BSR MAC CE, the pre-emptive BSR MAC CE, and the long truncated BSR MAC CE are not distinguished from each other, these BSR MAC CEs may be referred to as a long BSR MAC CE for description.

Hereinafter, when the pre-emptive BSR and the legacy BSR are not distinguished from each other, these BSRs may be referred to as "BSR".

The first embodiment is an example in which the IAB node 300 reports, to the parent node, the buffer size of each logical channel group associated with the hop count.

Specifically, first, a donor base station (for example, the donor node 200) including first and second relay nodes as lower nodes configures the first relay node (for example, the IAB node 300-T) with correspondence information indicating the correspondence relationship between the hop count of the logical channel (LCH) and the logical channel group (LCG). Second, the first relay node transmits a buffer status report (BSR), based on the correspondence information, to the second relay node (e.g., the parent node 300-P) that is the parent node of the first relay node. Third, the second relay node transmits an uplink grant (UL grant) to the first relay node, based on the correspondence information and the buffer status report.

As described above, in the first embodiment, the hop count of the LCH is associated with the LCG. The IAB node 300 uses the BSR to report, to the parent node, the buffer size of the LCG associated with the hop count. Since the LCG and the hop count are associated with each other, the parent node can recognize the buffer size in the LCG as the buffer size corresponding to the hop count. The parent node allocates an uplink radio resource to the IAB node 300 using the hop count as well as the buffer size.

Therefore, the parent node can allocate more uplink radio resources to the IAB node 300 with higher latency (or a larger hop count) than other IAB nodes, for example. This enables a reduction in latency and allows the topology-wide fairness to be achieved.

Configuration Example of First Embodiment

Figure 12A:
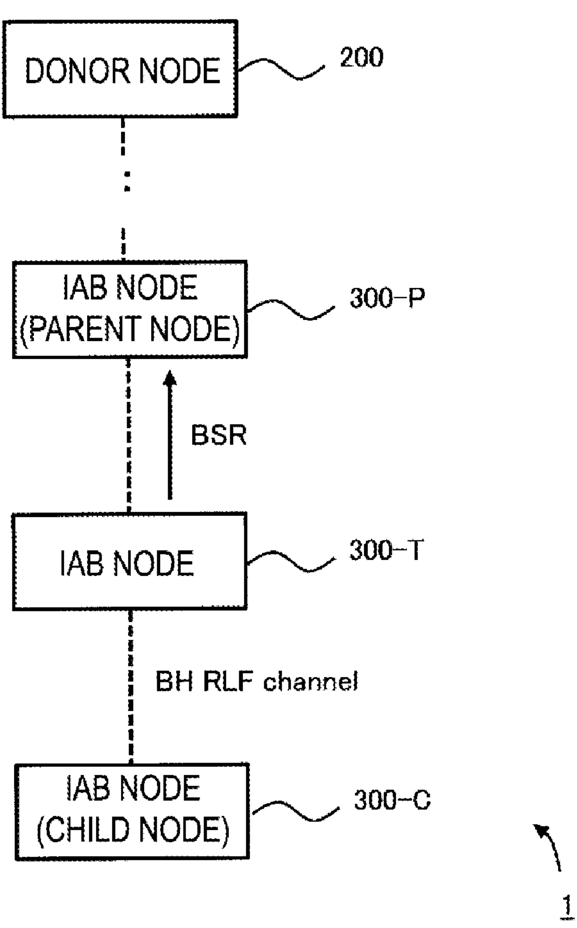
FIG. 12A is a diagram illustrating a configuration example of a cellular communication system according to the first embodiment.

First, a configuration example of the first embodiment will be described. FIG. 12A is a diagram illustrating a configuration example of the cellular communication system 1 according to the first embodiment.

As illustrated in FIG. 12A, the donor node 200 includes IAB nodes 300-P, 300-T, and 300-C as lower nodes. The topology (or network) built by the donor node 200 may include other IAB nodes.

The IAB node 300-P is a parent node of the IAB node 300-T. The IAB node 300-C is a child node of the IAB node 300-T. Hereinafter, the IAB node 300-P may be referred to as the parent node 300-P, and the IAB node 300-C may be referred to as the child node 300-C.

The upper node of the IAB node 300-T may be the parent node 300-P. The upper node of the IAB node 300-T may be the donor node 200. Note that the parent node 300-P may be the donor node 200.

In the example in FIG. 12A, the IAB node 300-T is connected to one parent node 300-P, but may be connected to a plurality of parent nodes 300-P1, 300-P2, . . . . In this case, for example, the IAB node 300-T may be connected to the parent node 300-P1 and the parent node 300-P2 through Dual Connectivity (DC). The parent node 300-P1 is configured with a master cell group (MCG) in Dual Connectivity, and the parent node 300-P2 is configured with a secondary cell group (SCG). Accordingly, the IAB node 300-T can be connected to the two parent nodes 300-P1 and 300-P2.

Although the child node 300-C is connected to the IAB node 300-T in the example of FIG. 12A, the UE 100 may be connected to the IAB node 300-T instead of the child node 300-C. The IAB node 300-T may connect to both the child node 300-C and the UE 100. In the following description, the child node 300-C is assumed to be connected to the IAB node 300-T.

Operation Example of First Embodiment

Figure 11:
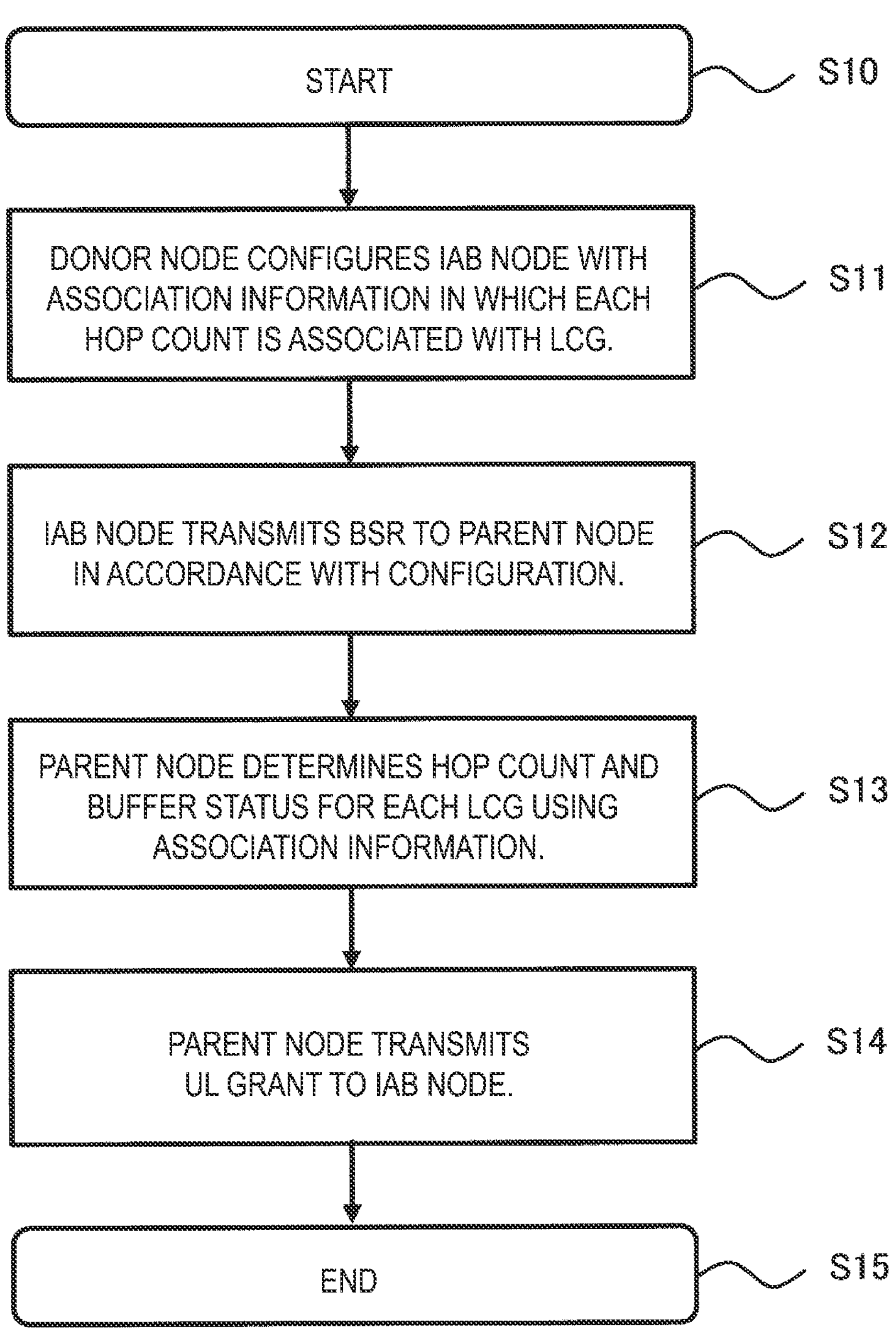
FIG. 11 is a flowchart illustrating an operation example according to the first embodiment.

FIG. 11 is a flowchart illustrating an operation example according to the first embodiment. The configuration example of the cellular communication system 1 illustrated in FIG. 12A will be used appropriately to describe the operation example in FIG. 11.

As illustrated in FIG. 11, the donor node 200 starts processing in step S10.

In step S11, the donor node 200 configures the IAB node 300-T (the IAB-MT or the IAB-DU of the IAB node 300-T) with association information in which the LCG is associated with each hop count. The association information is classified according to the hop count of the LCH. For example, the association information includes information indicating that the hop count "2" of the LCH is associated with LCG #8 to LCG #15 and that the hop count "3" of the logical channel is associated with LCG #16 to LCG #32.

Here, the hop count may be the total hop count in a route to which the LCH belongs. Alternatively, the hop count may be the hop count present in the LCH before the IAB node 300-T is reached. Alternatively, the hop count may be the number of remaining hops from the IAB node 300-T to the donor node 200 in the LCH.

In this way, the association information may be correspondence information representing the correspondence relationship between the hop count and the LCG of the LCH. Hereinafter, the "association" may be used to mean both "associating" and "corresponding" without distinction.

The CU of the donor node 200 may be configured by transmitting, to the IAB-MT of the IAB node 300-T, an RRC message including the association information. The CU of the donor node 200 may be configured by transmitting, to the IAB-DU of the IAB node 300-T, an F1AP message including the association information.

For the donor node 200, the parent node 300-P may be configured with the association information. In this case, the donor node 200 may perform the configuration by transmitting, to the parent node 300-P, the RRC message or the F1AP message including the association information in the same manner as described above. Alternatively, the parent node 300-P may be preconfigured with the association information in advance as hard coding.

In step S12, the IAB-MT of the IAB node 300-T transmits the BSR to the parent node 300-P in accordance with the configuration. In the BSR, the buffer size is stored for each LCG associated with the hop count. For example, the BSR stores the buffer size of LCG #8 corresponding to the hop count "2", the buffer size of LCG #9 corresponding to the hop count "2", . . . , the buffer size of LCG #15 corresponding to the hop count "2", . . . , the buffer size of LCG #16 corresponding to the hop count "3", . . . . Note that the BSR may be a legacy BSR as described above. The BSR may be a pre-emptive BSR.

In step S13, in response to the reception of the BSR, the IAB-DU of the parent node 300-P determines the hop count and the buffer status for each LCG using the association information. For example, upon receiving the report of the buffer size of LCG #15 as the BSR, the parent node 300-P determines the buffer size to be the hop count "2" corresponding to LCG #15 using the association information.

In step S14, the IAB-DU of the parent node 300-P allocates an uplink radio resource to the IAB-MT of the IAB node 300-T based on the association information and the BSR. Then, the parent node 300-P transmits the UL grant including the allocation information to the IAB node 300-T. For example, the IAB-DU of the parent node 300-P allocates more uplink radio resources to the IAB-MT of the IAB node 300-T in which data of an LCG having a larger hop count than others is retained, than to other IAB-MTs.

In step S15, the series of processing operations is ended.

Variation of First Embodiment

A variation of the first embodiment will be described. The variation of the first embodiment is an example in which a plurality of LCGs are allocated to one LCH for each hop count. Specifically, the first relay node (for example, the IAB node 300-T) determines the logical channel group corresponding to the hop count of the packet received via the logical channel, based on the correspondence information, and transmits, to the second relay node (for example, the parent node 300-P), the buffer status report including the buffer size of the logical channel group.

Figure 12B:
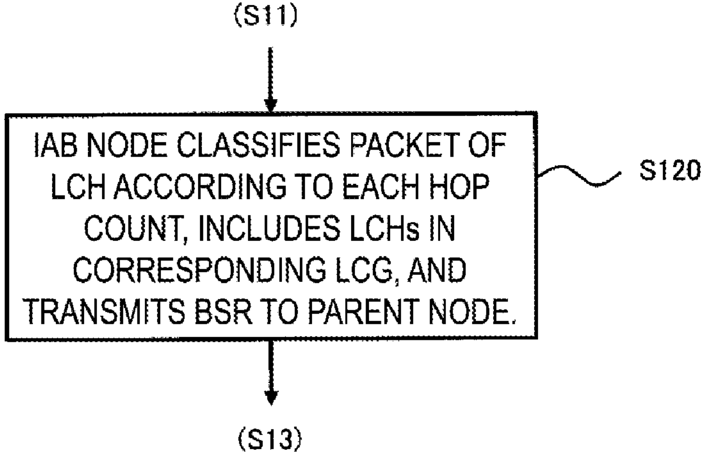
FIG. 12B is a diagram illustrating an operation example according to a variation of the first embodiment.

FIG. 12B is a flowchart illustrating an operation example according to the variation of the first embodiment. The operation example illustrated in FIG. 12B will be described by appropriately using the configuration example of the cellular communication system 1 illustrated in FIG. 12A.

However, N UE bearers are mapped to one LCH (BH RLC channel) (1:N mapping). Each of the N UE bearers is assumed to include a route (hop count) different from the routes of other UE bearers.

When the association information is configured (step S11: the same as FIG. 11), the IAB node 300-T classifies the packets received via the LCH (BH RLC channel) by the hop count in step S120.

Here, the IAB node 300-T may check the hop count as follows, for example.

First, the hop count may be obtained from the header of the received packet. When the number-of-hops information is stored in the BAP header of the received BAP packet, (the IAB-DU of) the IAB node 300-T can check the hop count by acquiring the number-of-hops information from the BAP header.

Second, the hop count may be acquired from the implementation of the IAB node 300-T. In other words, the IAB-DU of the IAB node 300-T knows from which BH RLC channel the packet has been received. Each time a packet is received, the IAB-DU of the IAB node 300-T notifies the IAB-MT of the IAB node 300-T of which packet has passed through which route. The IAB-MT of the IAB node 300-T may acquire the hop count, based on the information notified from the IAB-DU.

Then, in step S120, the IAB-MT of the IAB node 300-T determines the LCG corresponding to the classified hop count, based on the association information, and calculates the buffer size for each LCG. The IAB-MT of the IAB node 300-T transmits, to the parent node 300-P, the BSR including the calculated buffer size.

Upon ending the processing of step S12, the IAB node 300-T performs the processing of step S13 (FIG. 11) and subsequent steps as in the first embodiment.

In the variation of the first embodiment, since the IAB node 300-T determines the LCG for each packet and calculates the buffer size, the buffer size can be reported to the parent node 300-P on a per-packet basis. The parent node 300-P can allocate more resources to the IAB node 300-T including packets with high latency than to other IAB nodes. This enables a reduction in latency and allows the fairness to be achieved.

Second Embodiment

Now, a second embodiment will be described.

As illustrated in FIGS. 10A and 10B, in Release 16 of 3GPP, the upper limit of the number of LCGs is 8 (for example, FIG. 10B) in the number of LCGs and 3 bits (for example, FIG. 10A) in the number of bits. Hereinafter, the upper limit is expressed as "X pieces (Y bits)".

On the other hand, the upper limit of the number of LCHs is 65,536 (16 bits) for the IAB-MT. When the upper limit of the number of LCGs is set comparable to the upper limit of the number of LCHs, the upper limit of the number of LCGs can also be set to 65,536 (16 bits). Assume that the number of LCGs is 65,536 (16 bits) for high-resolution scheduling. In such a case, when the IAB node 300 transmits 65,536 (16 bits) LCGs using the existing BSR MAC CE, the BSR illustrated in FIG. 10B is transmitted 8192 times.

However, this results in a large overhead.

Thus, in the second embodiment, the upper limit value for the LCG can be configured, and the IAB node 300-T reports the BSR to the parent node 300-P using the BSR MAC CE format corresponding to the configured upper limit value for the LCG.

Accordingly, the IAB node 300-T uses BSR MAC CEs in a fixed extended format and BSR MAC CEs in a variable extended format in addition to the existing BSR MAC CE format (FIGS. 10A and 10B). The IAB node 300-T selects (or determines) the MAC CE format corresponding to the upper limit value for the LCG from among the MAC CE formats described above.

Specifically, first, the upper node (for example, the parent node 300-P or the donor node 200) of the first relay node (for example, the IAB node 300-T) configures the first relay node with the upper limit value for the logical channel group. Second, the first relay node determines the MAC control element (CE) format corresponding to the upper limit value. Third, the first relay node transmits a buffer status report, using the determined MAC control element format, to the second relay node (e.g., the parent node 300-P) that is the parent node of the first relay node.

As described above, since the IAB node 300-T can report the BSR by using the BSR MAC CE corresponding to the upper limit value for the LCG, the BSR is not transmitted a plurality of times, enabling a reduction in overhead.

Now, specific examples of the BSR MAC CE of the fixed extended format and the BSR MAC CE of the variable extended format will be described.

Figures 13A, 13B:
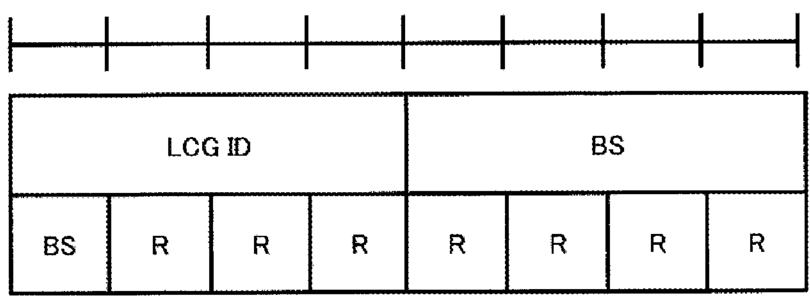
FIG. 13A and FIG. 13B are diagrams illustrating an example of a BSR MAC CE in a fixed extended format according to a second embodiment.

FIGS. 13A and 13B are diagrams illustrating a configuration example of the BSR MAC CE of the fixed extended format according to the first embodiment. Both FIGS. 13A and 13B are diagrams illustrating an example in which the upper limit value for LCGs is 16 (4 bits). Of these figures, FIG. 13A illustrates an example of the short BSR MAC CE when the upper limit value for LCGs is 16 (4 bits). FIG. 13B illustrates an example of the long BSR MAC CE when the upper limit value for LCGs is 16 (4 bits).

As illustrated in FIG. 13A, when the upper limit value for the LCG is 16 (4 bits), in the short BSR MAC CE, the "LCG ID" region includes 4 bits in accordance with the upper limit value. The short BSR MAC CE includes one bit more, compared to the short BSR MAC CE in FIG. 10A. The "LCG ID" region stores the same identification information of the logical channel group for which the buffer size is reported as in the existing short BSR MAC CE (FIG. 10A).

Note that the "BS" region includes 5 bits. Similar to the existing BSR MAC CE, the "BS" region also stores the total data amount available over all LCHs in the LCG in accordance with a predetermined calculation procedure. The "BS" region is followed by "Rs" (reserved region).

As illustrated in FIG. 13B, the long BSR MAC CE includes 16 "$LCG_i$" regions ($LCG_0$ to $LCG_{15}$) in accordance with the upper limit value. The "$LCG_i$" region also stores a value indicating the presence of an $LCG_i$ buffer size, as is the case with the existing long BSR MAC CE. The "BS" region illustrated in FIG. 13B also stores the same predetermined buffer size as that in the existing long BSR MAC CE.

Figures 14A, 14B:
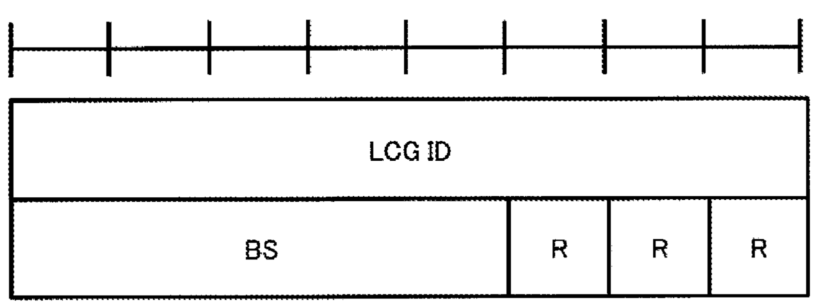
FIG. 14A and FIG. 14B are diagrams illustrating an example of the BSR MAC CE in the fixed extended format according to the second embodiment.

FIGS. 14A and 14B are diagrams illustrating an example of BSR MAC CEs in the fixed extended format according to the second embodiment. FIGS. 14A and 14B each illustrate an example in which the upper limit value for the LCG is 256 (8 bits). Of these figures, FIG. 14A illustrates an example of the short BSR MAC CE when the upper limit value for the LCG is 256 (8 bits). FIG. 14B illustrates an example of the long BSR MAC CE when the upper limit value for the LCG is 256 (8 bits).

As illustrated in FIG. 14A, when the upper limit value for the LCG is 256 (8 bits), the "LCG ID" region includes 8 bits in accordance with the upper limit value. Note that the "BS" region includes 5 bits, and is followed by "Rs".

As illustrated in FIG. 14B, when the upper limit value for the LCG is 256 (8 bits), 256 "$LCG_i$" regions ($LCG_0$ to $LCG_{255}$) are present.

As described above, when the upper limit for the LCG is configured with a value of 16 (4 bits), the IAB node 300-T determines to use the BSR MAC CE illustrated in FIG. 13A or 13B, and when the upper limit value for the LCG is 256 (8 bits), the IAB node 300-T determines to use the BSR MAC CE illustrated in FIG. 14A or 14B.

The upper limit value is merely an example, and when the upper limit is configured with a value of 32 (5 bits), the IAB node 300-T may determine to use the short BSR MAC CE with an "LCG ID" region of 5 bits or the long BSR MAC CE with 32 "$LCG_i$" regions. When the upper limit value is configured with a value of 64 (6 bits), the IAB node 300-T may determine to use the short BSR MAC CE with "LCG ID" of 6 bits or the long BSR MAC CE with 64 "$LCG_i$" regions.

The IAB node 300-T may determine to use the short BSR MAC CE with the "LCG ID" region corresponding to the upper limit value or the long BSR MAC CE with the "$LCG_i$" region corresponding to the upper limit value.

Note that the IAB node 300-T may determine to use the short BSR MAC CE when reporting the buffer size of a certain LCG, and may determine to use the long BSR MAC CE when reporting the buffer sizes of a plurality of LCGs.

Figure 15A:
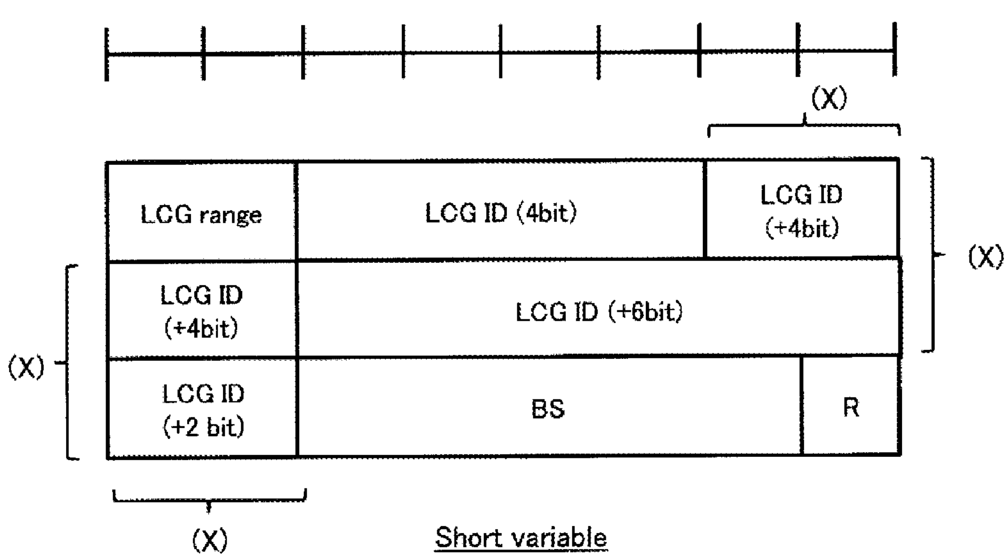
FIG. 15A and FIG. 15B are diagrams illustrating an example of the BSR MAC CE in a variable extended format according to the second embodiment.
Figure 15B:
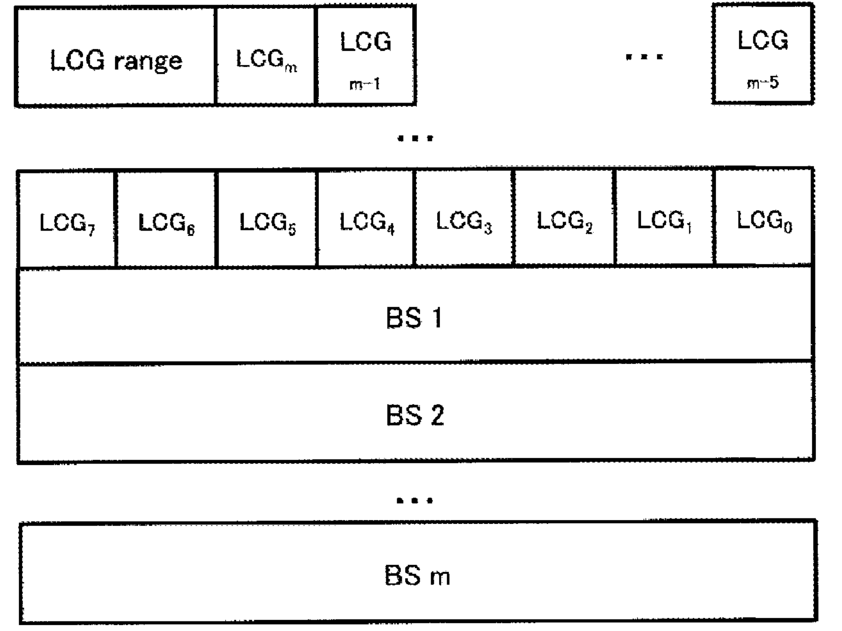

FIGS. 15A and 15B are diagrams illustrating an example of the variable extended format according to the second embodiment. Of these figures, FIG. 15A illustrates an example of the short variable extended format for the short BSR MAC CE, and FIG. 15B illustrates an example of the long variable extended format for the long BSR MAC CE.

As illustrated in FIG. 15A, the short variable extended format further includes an "LCG range" region.

The "LCG range" region stores bits corresponding to the upper limit value for the LCG configured for the IAB node 300-T. For example, the "LCG range" region stores "00" when the upper limit value for the LCG is "16 (4 bits)", stores "01" when the upper limit value for the LCG is "256 (8 bits)", stores "10" when the upper limit value for the LCG is "16,384 (14 bits)", and stores "11" when the upper limit value for the LCG is "65,536 (16 bits)".

The relationship between the upper limit value for the LCG and the bits stored in the "LCG range" region may differ from the above-described one. The number of bits stored in the "LCG range" region may be 3 bits or more in accordance with the upper limit value for the LCG.

As illustrated in FIG. 15A, the short variable extended format includes the "LCG ID" region, and the bit length of the "LCG ID" region is variable in accordance with the upper limit value for the LCG. In other words, for the "LCG ID" region present in the (X) region in FIG. 15A, spaces in (X) regions in the drawing can be sequentially filled starting from top with the leftmost space in accordance with the upper limit value. The "LCD ID" region includes the "X" region and the "LCD ID" region (4 bits) other than the "X" region.

For example, when the upper limit value for the LCG is 256 (8 bits), the "LCG ID" region in the drawing includes the two uppermost regions in the (X) region and two regions from the left in the second regions from the top of the (X) region. Following the "LCD ID" region, the "BS" region is processed in such a manner that spaces in the "BS" region are sequentially filled starting with the leftmost space, with spare regions corresponding to "Rs". For example, when the upper limit value for the LCG is 32 (5 bits), the "LCG ID" region in the drawing includes the left region in the uppermost regions in the (X) region.

In the example of FIG. 15A, the "BS" region includes 5 bits. The "BS" region may include more than 5 bits.

As illustrated in FIG. 15B, the long variable extended format further includes the "LCG range" region. The "LCG range" region stores the same upper limit value for the LCG as that in the "LCG range" region of the short variable extended format.

The "$LCG_i$" region is configured with the number of "$LCG_i$" regions in accordance with the upper limit value for the LCG. For example, when the upper limit value for the LCG is 16 (4 bits), the region is configured with 16 "$LCG_i$" regions from $LCG_0$ to $LCG_{15}$ (m=15). When the upper limit value for the LCG is 256 (8 bits), the region is configured with 256 "$LCG_i$" regions from $LCG_0$ to $LCG_{255}$ (m=255).

Whether the IAB node 300-T uses the fixed extended format (FIGS. 13A to 14B) or the variable extended format (FIGS. 15A and 15B) may be optionally determined.

Figure 16:
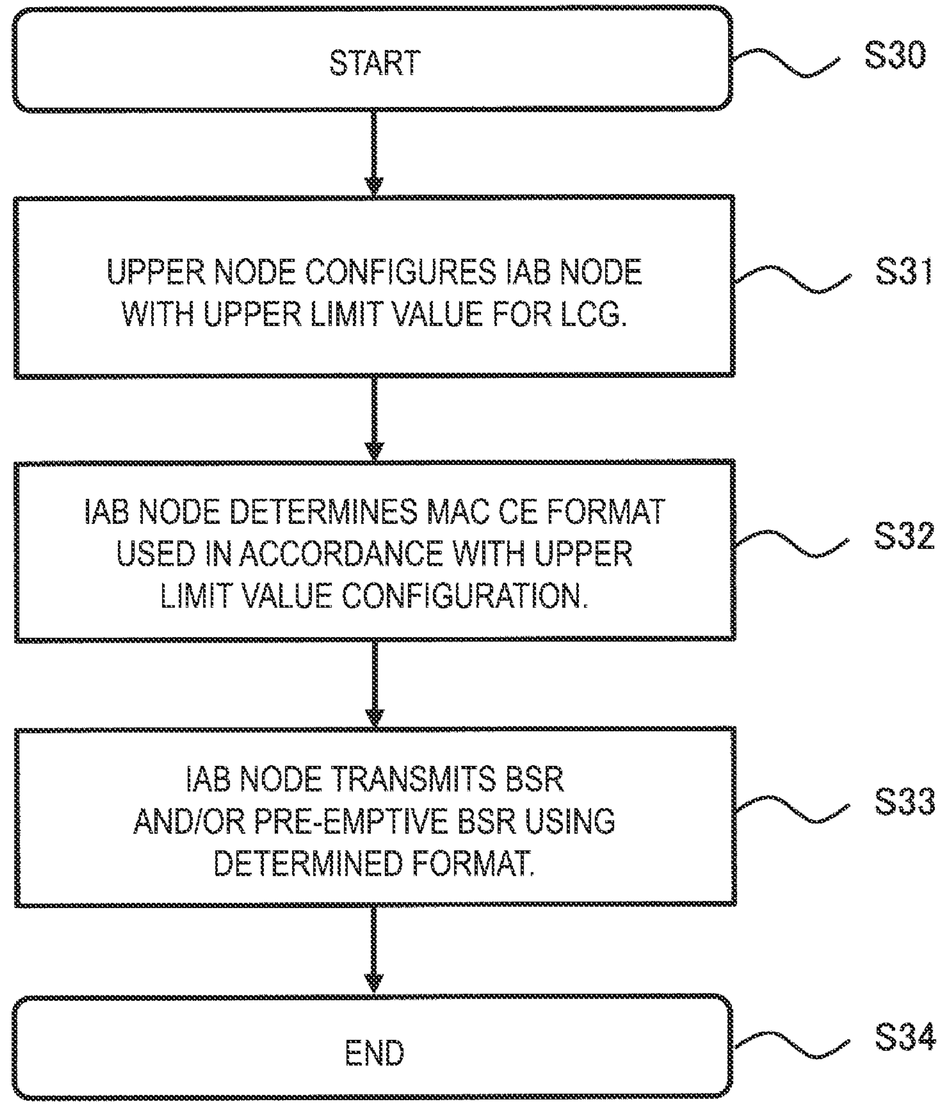
FIG. 16 is a flowchart illustrating an operation example according to the second embodiment.

FIG. 16 is a flowchart illustrating an operation example according to the second embodiment. The operation example illustrated in FIG. 16 will be described by appropriately using the configuration example of the cellular communication system 1 illustrated in FIG. 12A.

As illustrated in FIG. 16, the IAB node 300-T starts processing in step S30.

In step S31, the upper node (parent node 300-P or donor node 200) configures the IAB node 300-T with an upper limit value for the LCG. The upper limit value is, for example, any one of 8 (3 bits), 16 (4 bits), 32 (5 bits), . . . , 256 (8 bits), . . . , 16,384 (16 bits), . . . , and 65,536 (16 bits).

Note that when the upper node is the parent node 300-P, the IAB-DU of the parent node 300-P may configure the IAB-MT of the IAB node 300-T with the upper limit value for the LCG by using the MAC CE, a BAP Control PDU, or the like. When the upper node is the donor node 200, the CU of the donor node 200 may configure the IAB-DU (or the IAB-MT) of the IAB node 300-T with the upper limit value for the LCG by using the F1AP message, the RRC message, or the like.

Note that when the upper node is the donor node 200, the donor node 200 may transmit the upper limit value for the LCG to the parent node 300-P. Alternatively, upon receiving the configured upper limit value for the LCG from the donor node 200, the IAB-MT of the IAB node 300-T may transmit the upper limit value to the IAB-DU of the parent node 300-P.

In step S32, the IAB-MT of the IAB node 300-T determines (or selects) an MAC CE format to be used according to the configured upper limit value. For example, when the upper limit value is eight, the IAB-MT of the IAB node 300-T selects the existing format (for example, FIG. 10A or FIG. 10B). For example, when the upper limit value is 16 or more, the IAB-MT of the IAB node 300-T selects the fixed extended format (for example, FIGS. 13A to 14B) or the variable extended format (for example, FIG. 15A or 15B).

In step S33, the IAB-MT of the IAB node 300-T transmits a legacy BSR and/or a pre-emptive BSR to the parent node 300-P using the determined format.

Then, in step S34, the IAB node 300-T ends a series of processing operations.

Variation of Second Embodiment

A variation of the second embodiment will be described. The variation of the second embodiment is an example in which the configured upper limit value for the LCG varies between the legacy BSR and the pre-emptive BSR. Specifically, the upper node (e.g., the parent node 300-P or donor node 200) configures the first relay node (e.g., the IAB node 300-T) with different upper limit values for the legacy and pre-emptive BSRs.

As a result, for example, the IAB node 300-T can report buffer sizes corresponding to different upper limit values for the legacy BSR and the pre-emptive BSR. Specifically, this enables a response to, for example, a request to increase the upper limit value of the LCG to increase a scheduling resolution, with the upper limit value for the pre-emptive BSR being allowed to remain small.

Figure 17:
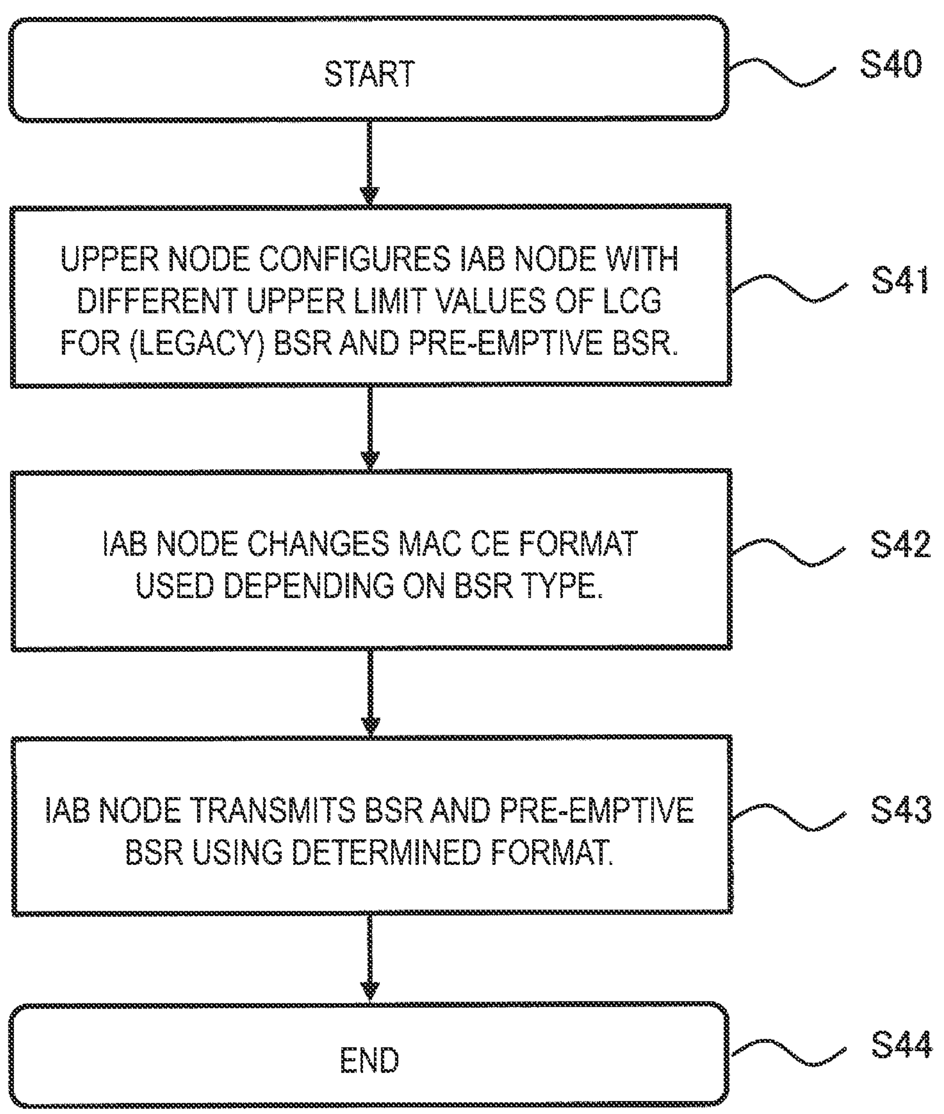
FIG. 17 is a diagram illustrating an operation example according to a variation of the second embodiment.

FIG. 17 is a flowchart illustrating an operation example according to the variation of the second embodiment. The operation example illustrated in FIG. 17 is described by appropriately using the configuration example of the cellular communication system 1 illustrated in FIG. 12A.

As illustrated in FIG. 17, the upper node (parent node 300-P or donor node 200) starts processing in step S40.

In step S41, the upper node configures (the IAB-MT or the IAB-DU of) the IAB node 300-T with different upper limit values for the LCG for the legacy BSR and the pre-emptive BSR. Thus, for example, the upper limit value for the LCG and the type of the BSR are configured in association with each other. As in the second embodiment, when the upper node is the donor node 200, the F1AP message or the like may be used for configuration. When the upper node is the parent node 300-P, the BAP Control PDU or the like may be used for configuration.

In step S42, the IAB-MT of the IAB node 300-T determines (or changes) the MAC CE format to be used according to the type of the BSR. For example, the IAB-MT of the IAB node 300-T selects the BSR MAC CE format in FIG. 13A or 13B when the upper limit value for the LCG for the legacy BSR is 16 (4 bits), and selects the BSR MAC CE format in FIG. 14A or 14B when the upper limit value for the LCG for the pre-emptive BSR is 256 (8 bits).

In step S43, the IAB-MT of the IAB node 300-T transmits the legacy BSR and the pre-emptive BSR, using the determined MAC CE format.

Then, in step S44, the IAB node 300-T ends a series of processing operations.

Third Embodiment

Now, an example of a third embodiment will be described. The third embodiment is an example in which the legacy BSR and the pre-emptive BSR are transmitted using one BSR MAC CE.

Specifically, first, the upper node (for example, the parent node 300-P or the donor node 200) of the first relay node (for example, the IAB node 300-T) configures the first relay node with an integrated buffer status report. Second, the first relay node transmits the integrated buffer status report to the second relay node (for example, the parent node 300-P) that is the parent node of the first relay node, in accordance with the configuration, the integrated buffer status report storing the buffer sizes corresponding to the logical channel groups classified by the type of buffer status report.

A single organized BSR MAC CE may be referred to as an integrated BSR. For example, similar to the legacy BSR (or the pre-emptive BSR), the integrated BSR stores LCGs and the buffer size (BS) of each LCG. When the integrated BSR reports the buffer size for one certain LCG, a MAC CE having the same format as the short BSR MAC CE may be used. When the integrated BSR reports the buffer size of each of a plurality of LCGs, a MAC CE having the same format as the long BSR MAC CE may be used.

Thus, the IAB node 300-T does not transmit a BSR of a different MAC CE format, enabling, for example, prevention of processing delay.

Figure 18:
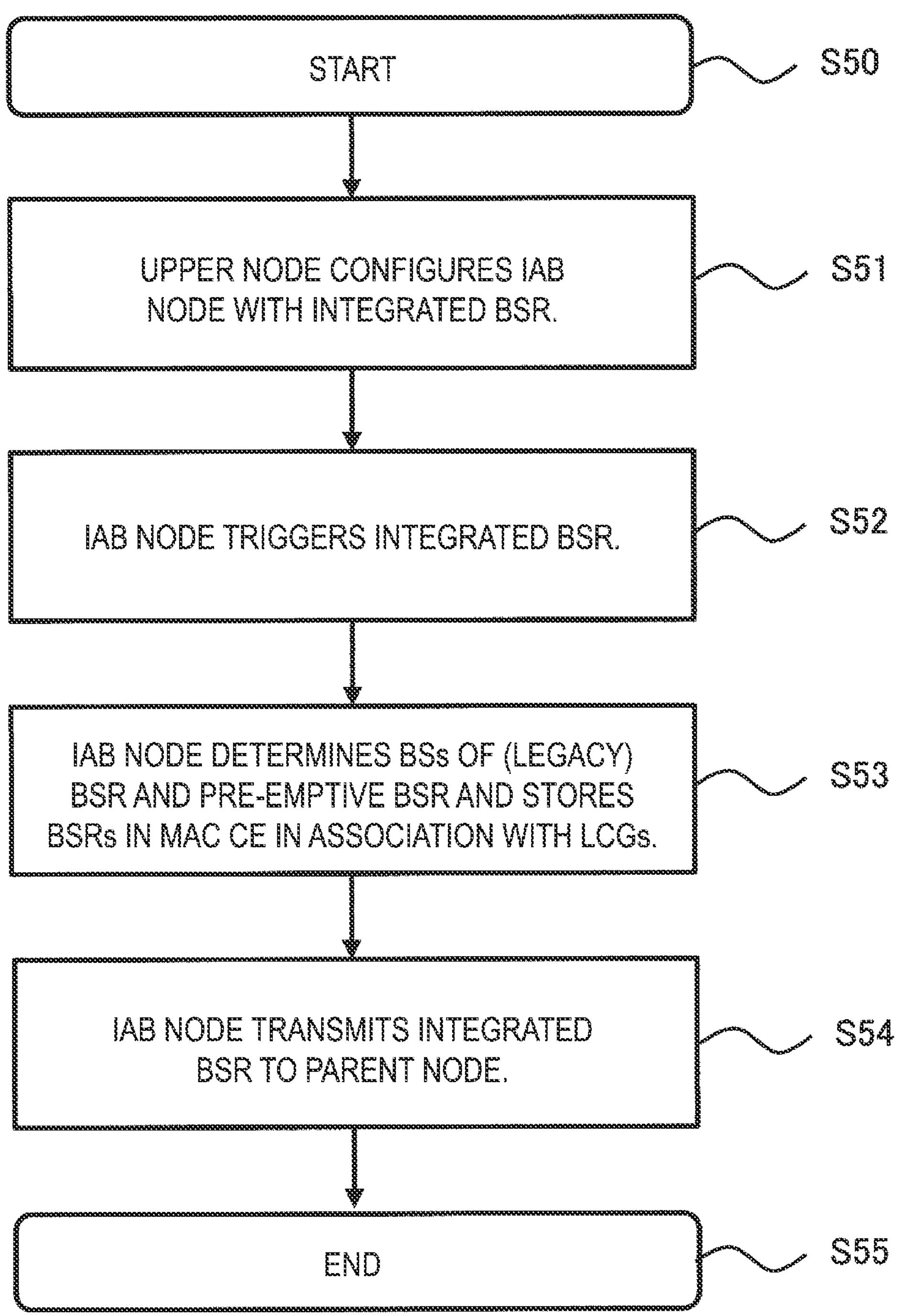
FIG. 18 is a flowchart illustrating an operation example according to a third embodiment.

FIG. 18 is a flowchart illustrating an operation example according to the third embodiment. The operation example illustrated in FIG. 18 will be described by appropriately using the configuration example of the cellular communication system 1 illustrated in FIG. 12A.

As illustrated in FIG. 18, the upper node (parent node 300-P or donor node 200) starts processing in step S50.

In step S51, the upper node configures the IAB-MT of the IAB node 300-T with the integrated BSR. In this case, the upper node may configure the LCGs in the integrated BSR and the BSR types in association with one another. Such configuration may be that, for example, LCG #0 to LCG #3 in the integrated BSR respectively correspond to LCG #0 to LCG #3 in the legacy BSR, and LCG #4 to LCG #7 in the integrated BSR respectively correspond to LCG #0 to LCG #3 in the pre-emptive BSR.

When the upper node is the parent node 300-P, the integrated BSR may be configured using the BAP Control PDU, the MAC CE, or the like. When the upper node is the donor node 200, the integrated BSR may be configured using the F1AP message, the RRC message, or the like. The donor node 200 may perform the configuration on the parent node 300-P.

In step S52, the IAB-MT of the IAB node 300-T triggers the integrated BSR. The trigger may be a trigger condition for the legacy BSR. The trigger may be a trigger condition for the pre-emptive BSR. For example, the IAB-MT of the IAB node 300-T may trigger the integrated BSR at a trigger timing for the legacy BSR. The IAB-MT of the IAB node 300-T may trigger the integrated BSR at a trigger timing for the pre-emptive BSR. The upper node may provide the IAB-MT of the IAB node 300-T with configuration of which of the two trigger conditions is to be used to trigger the integrated BSR.

In step S53, the IAB-MT of the IAB node 300-T determines the buffer size of the legacy BSR (BS-L) and the buffer size of the pre-emptive BSR (BS-P). Then, the IAB-MT of the IAB node 300-T stores these buffer sizes in the MAC CE of the integrated BSR in association with the LCGs.

For example, the IAB node 300-T respectively associates BS-L #0 to BS-L #3 with LCG #0 to LCG #3. For example, the IAB node 300-T respectively associates BS-P #0 to BS-P #3 with LCG #4 to LCG #7. Then, the IAB node 300-T respectively stores, for example, BS-L #0 to BS-L #3 in the MAC CE of the integrated BSR as the buffer sizes of LCG #0 to LCG #3 in the integrated BSR. The IAB node 300-T stores, for example, BS-P #0 to BS-P #3 in the MAC CE of the integrated BSR as the buffer sizes of LCG #4 to LCG #7 in the integrated BSR.

In step S54, the IAB-MT of the IAB node 300-T transmits the integrated BSR to the parent node 300-P.

Then, in step S55, the IAB node 300-T ends a series of processing operations.

Fourth Embodiment

Now, a fourth embodiment will be described.

BH RLF Indication

In a network including a plurality of IAB nodes 300, a failure may occur in a backhaul link between the IAB nodes 300. Such a failure is referred to as "Backhaul Radio Link Failure (BH RLF)".

Figure 19:
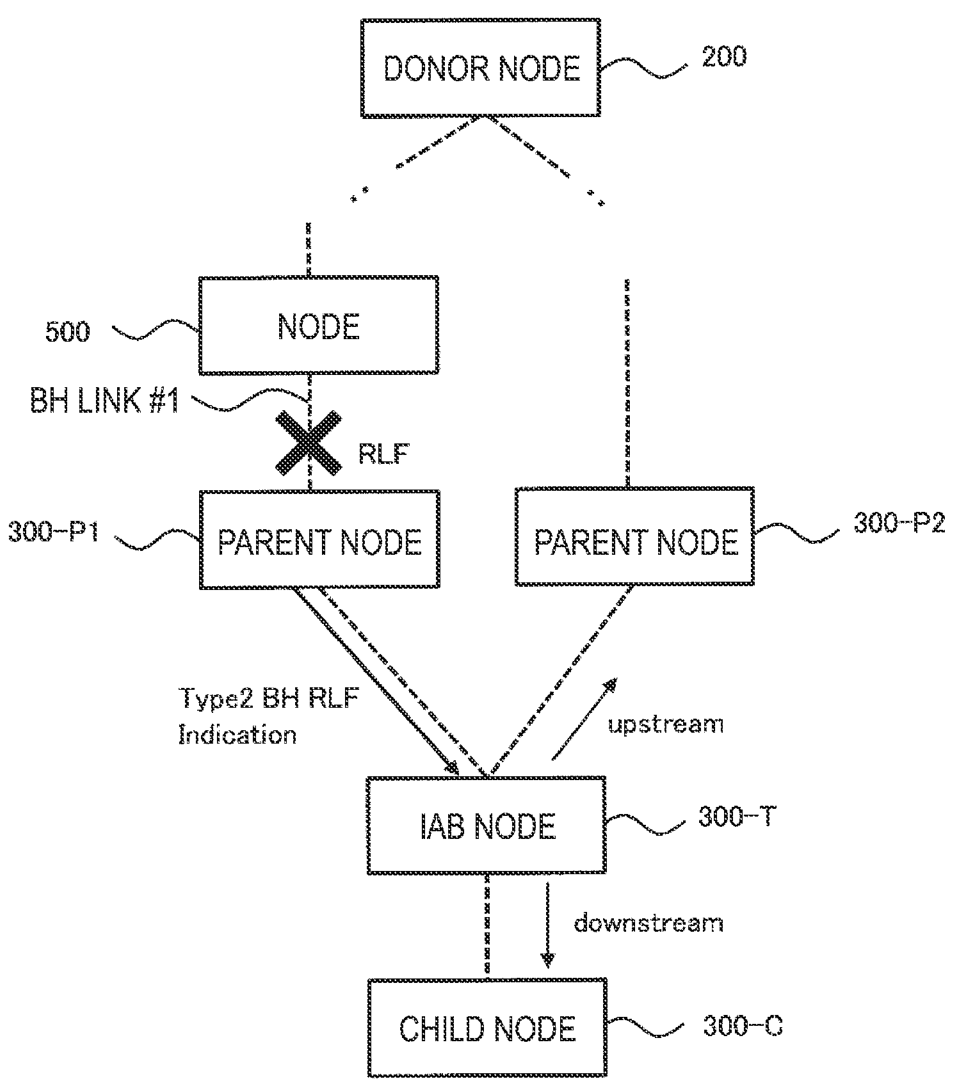
FIG. 19 is a diagram illustrating an example of an inter-node relationship according to a fourth embodiment.

FIG. 19 is a diagram illustrating an example of an inter-node relationship according to the fourth embodiment. FIG. 19 also illustrates an example of a BH RLF according to the fourth embodiment. FIG. 19 illustrates an example of a case where a BH RLF occurs in a BH link #1 between an IAB node 300-P1 that is a parent node of the IAB node 300-T and a node 500 that is a parent node of the IAB node 300-P1.

The IAB-MT of the parent node 300-P1 is assumed to detect a BH RLF. The IAB-DU of the parent node 300-P1 transmits a failure occurrence notification to the IAB node 300-T on the downstream side.

The failure occurrence notification indicating that a BH RLF has been detected is referred to as Type1 BH RLF Indication. The BH link RLF detected by the child node (which is the parent node 300-P1 in the example of FIG. 19) may be the Type1 BH RLF Indication.

A recovery attempt notification indicating that recovery from a failure (BH RLF) occurring in the backhaul link is being attempted is referred to as Type2 BH RLF Indication. In the example illustrated in FIG. 19, the parent node 300-P1 transmits the Type2 BH RLF Indication to the IAB node 300-T.

When the Type1 BH RLF Indication and the Type2 BH RLF Indication are not distinguished from each other, the BH RLF Indications are referred to as Type1/2 BH RLF Indication. Note that although an example of the Type2 BH RLF Indication will mainly be described in each embodiment, the Type2 BH RLF Indication may be replaced with the Type1 BH RLF Indication. The reason is as follows. As described above, the Type1 BH RLF Indication is transmitted when a BH RLF is detected and the Type2 BH RLF Indication is transmitted when recovery is attempted, but in the IAB node 300, processing of attempting to recover from a BH RLF is performed immediately after the BH RLF is detected, and thus the Type1 BH RLF Indication and the Type2 BH RLF Indication are substantially the same notification.

Further, a recovery notification indicating that the BH link has recovered from the BH RLF is also present. Such recovery notification is referred to as "Type3 BH RLF Indication". Further, a failure notification indicating that the BH link has failed to recover from the RLF is also present. Such a failure notification is referred to as "Type4 BH RLF Indication".

In FIG. 19, in response to receiving the Type2 BH RLF Indication, the IAB node 300-T may perform various types of control. Details will be described below.

Note that the Type2 BH RLF Indication may hereinafter be referred to as a the Type2 Indication.

Local Rerouting

As described above, in a network including a plurality of IAB nodes 300, a BH RLF may occur in a backhaul link between the IAB nodes 300.

In a multi-hop network where packets are forwarded by a plurality of IAB nodes 300 one after another, data packets may be forwarded to a destination IAB node 300 (or donor node 200) via an alternative path. When a line failure occurs, forwarding a data packet using an alternative path may be referred to as local rerouting. The local rerouting may be performed by selecting an alternative path, while ignoring a routing configuration provided by the donor node 200. Alternatively, the local rerouting may be performed by selecting an alternative path from alternative path candidates configured by the donor node 200.

Conditional Handover

In a typical handover, the UE 100 reports, to the gNB 200, the measured value of the radio state of the serving cell and/or a neighbor cell, and based on this report, the gNB 200 determines the handover to the neighbor cell and transmits a handover instruction to the UE 100. Accordingly, when the radio state of the serving cell is rapidly degraded, in the typical handover, communication breakdown may occur before the handover is performed.

In contrast, in the conditional handover, when a preconfigured trigger condition is satisfied, a handover to the candidate cell corresponding to the trigger condition can autonomously be performed. Accordingly, problems with the typical handover such as communication disruption can be solved.

The execution condition for the conditional handover includes one or more trigger conditions. Configuration of the conditional handover includes a candidate cell and a trigger condition. The configuration of the conditional handover may include pluralities of combinations of a candidate cell and a trigger condition. The conditional handover is configured by, for example, an RRC message from the CU of the donor node 200 to (the IAB-MT of) the IAB node 300 and/or to the UE 100.

Control Example of Fourth Embodiment

For example, as illustrated in FIG. 19, a case is considered in which the IAB node 300-T is configured with Dual Connectivity and in which the IAB node 300-T can be connected to two parent nodes 300-P1 and 300-P2.

In such a case, upon receiving the Type2 Indication from the parent node 300-P1, the IAB node 300-T can perform local rerouting to switch the connection destination to the parent node 300-P2. Thus, the IAB node 300-T can transmit a packet in the upstream direction to the destination node (the donor node 200) while avoiding the BH link #1 in which a failure has occurred, and can provide a continued service to the UE 100.

However, a case of single connection is considered in which the IAB node 300-T is not configured with Dual Connectivity and is connected only to the parent node 300-P1. In such a case, even if the IAB node 300-T receives the Type2 Indication from the parent node 300-P1, the IAB node 300-T fails to switch the connection to the parent node 300-P1, and can do nothing until the IAB node 300-T receives the Type3 BH RLF Indication or the Type4 BH RLF Indication.

Accordingly, the IAB node 300-T is enabled to execute conditional handover upon receiving the Type2 Indication from the parent node 300-P1. To be specific, IAB node 300-T switches the connection from parent node 300-P1 to parent node 300-P2 by a conditional handover. Accordingly, the IAB node 300-T can transmit the packet in the upstream direction to the destination node while avoiding the BH link #1, and can provide the continued service to the UE 100.

As described above, when the IAB node 300-T can perform both the local rerouting and the conditional handover using the reception of the Type2 Indication as a trigger, the IAB node 300-T can select which of the local rerouting and the conditional handover is to be performed upon receiving the Type2 Indication.

In this case, such selection may be made by the IAB node 300-T itself by depending on the implementation of the IAB node 300-T.

However, the donor node 200 is a node that manages the entire topology. The donor node 200 also has the capability of controlling the topology-wide performance.

Accordingly, in the fourth embodiment, the donor node 200 can provide the IAB node 300-T with configuration of whether to perform the local rerouting or the conditional handover by using reception of the Type2 Indication as a trigger.

Specifically, first, the donor base station (for example, the donor node 200) with the first and second relay nodes as lower nodes configures the first relay node (for example, the IAB node 300-T) with the local rerouting and the conditional handover (CHO). Second, the first relay node receives, from the second relay node (e.g., the parent node 300-P1) that is the parent node of the first relay node, a failure recovery notification indicating that an attempt is being made to recover from a failure occurring in the backhaul link (e.g., BH link #1) between the second relay node and the parent node (e.g., the node 500) of the second relay node. Third, the first relay node performs the local rerouting or the conditional handover in response to receiving the failure recovery notification in accordance with the configuration. In such a case, the donor base station further provides the first relay node with configuration of whether to perform the local rerouting or the conditional handover in response to receiving the failure recovery notification.

As described above, the donor node 200 provides the IAB node 300-T with configuration of whether to perform the local rerouting or the conditional handover, enabling realization of control in consideration of the topology-wide fairness.

Operation Example of Fourth Embodiment

Figure 20:
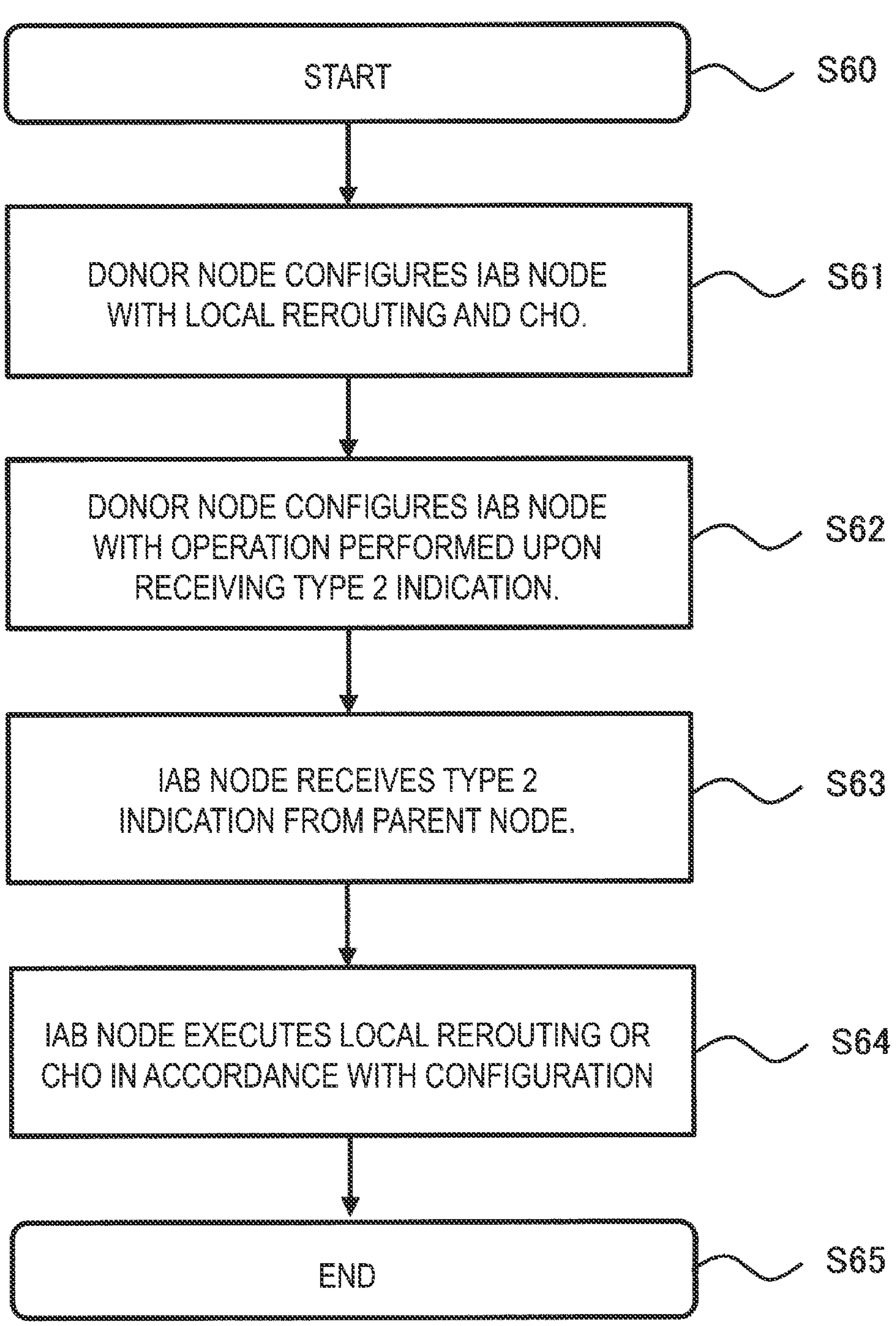
FIG. 20 is a diagram illustrating an operation example according to the fourth embodiment.

FIG. 20 is a flowchart illustrating an operation example according to the fourth embodiment. The operation example will be described by appropriately using the configuration example illustrated in FIG. 19.

As illustrated in FIG. 20, the donor node 200 starts processing in step S60.

In step S61, the CU of the donor node 200 configures the IAB-MT of the IAB node 300-T with the local rerouting and/or the conditional handover. For example, the CU of the donor node 200 may configure the local rerouting and/or the conditional handover utilizing the RRC message.

In step S62, the CU of the donor node 200 configures the IAB-MT of the IAB node 300-T with an operation performed upon receiving the Type2 Indication. The operation configuration is a configuration concerning whether to execute (or prioritize) the local rerouting or the conditional handover upon receiving the Type2 Indication.

Here, when "execution of local rerouting" is configured, the IAB node 300-T can transfer the packet to the parent node 300-P2 without performing configuration processing related to connection switching. Accordingly, from a short-term point of view, the service can advantageously be continued without occurrence of communication interruption.

On the other hand, when "execution of conditional handover" is configured, the IAB node 300-T performs configuration processing related to connection switching, but can also reconstruct Dual Connectivity. Accordingly, from a long-term point of view, load distribution for the network and communication quality (throughput or latency) can be maintained.

Note that for example, the CU of the donor node 200 may configure the IAB-MT of the IAB node 300-T for the operation by using the RRC message.

In step S63, the IAB-MT of the IAB node 300-T receives the Type2 Indication from the IAB-DU of the parent node 300-P1.

In step S64, the IAB-MT of the IAB node 300-T executes the local rerouting or the conditional handover in accordance with the configuration.

In step S65, the IAB node 300-T terminates a series of processing operations.

Variation of Fourth Embodiment

Now, a variation of the fourth embodiment will be described. The variation of the fourth embodiment is an example in which a rule is determined in advance and the IAB node 300-T executes the local rerouting or the conditional handover using the reception of the Type2 Indication as a trigger in accordance with the rule.

Specifically, when the first relay node (for example, the IAB node 300-T) executes the local rerouting or the conditional handover, the first relay node executes the local rerouting or the conditional handover according to a preconfigured rule.

Here, the "preconfigured" indicates that, for example, when the IAB node 300-T is installed, the information is already configured (stored) in a memory. The IAB-MT of the IAB node 300-T reads, from the memory, the information related to the configuration or the like, and executes the information to perform the local rerouting or the conditional handover using the reception of the Type2 Indication as a trigger. Alternatively, the execution may be determined by hard coding in the specifications.

Figure 21:
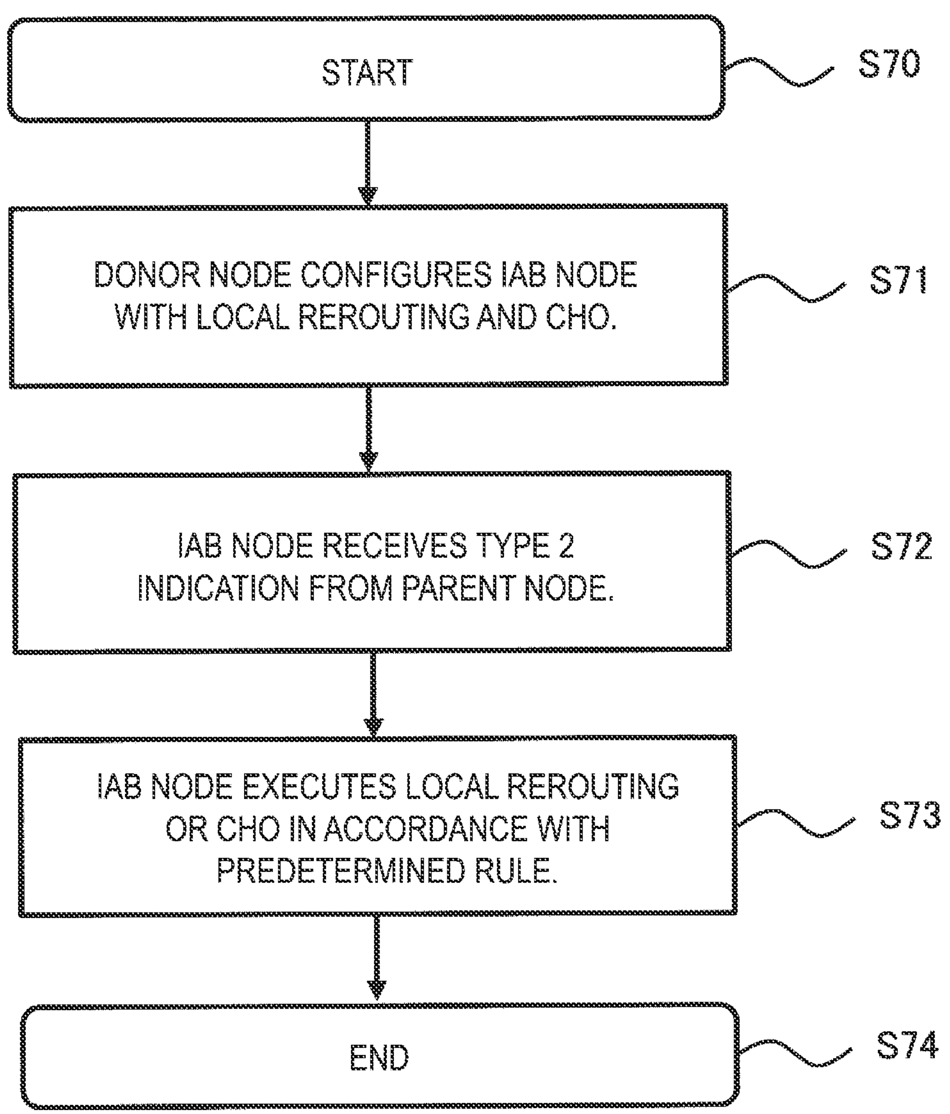
FIG. 21 is a diagram illustrating an operation example according to a variation of the fourth embodiment.

FIG. 21 is a flowchart illustrating an operation example according to the variation of the fourth embodiment. Steps S71 and S72 are respectively the same as steps S61 and S63 in the fourth embodiment.

In step S72, the IAB node 300-T executes the local rerouting or the conditional handover in accordance with a predetermined rule. The predetermined rule is, for example, as described below. Specifically, the IAB node 300-T executes the local rerouting when a Dual Connectivity connection is established and there is a path (alternative path) for local rerouting. The IAB node 300-T executes the conditional handover when no Dual Connectivity connection is established or when there is no path (alternative path) for local rerouting.

Then, in step S74, the IAB node 300-T ends a series of processing operations.

Other Embodiments

A program causing a computer to execute each type of processing performed by the UE 100, the gNB 200, or the IAB node 300 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing each type of processing to be performed by the UE 100, the gNB 200, or the IAB node 300 may be integrated, and at least part of the UE 100, the gNB 200, or the IAB node 300 may be configured as a semiconductor integrated circuit (a chipset or a System on a chip (SoC)).

The phrases "based on" and "depending on" used in the present disclosure do not mean "based only on" and "only depending on/in response to," unless specifically stated otherwise. The phrase "based on" means both "based only on" and "based at least in part on." The phrase "depending on/in response to" means both "only depending on/in response to" and "at least partially depending on/in response to." "Obtain/acquire" may mean to obtain information from stored information, to obtain information from information received from another node, or to obtain the information by generating the information. The terms "include", "comprise" and variations thereof do not mean "include only items stated" but instead mean "may include only items stated" or "may include not only the items stated but also other items." The term "or" used in the present disclosure is not intended to be "exclusive or." Any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

Although embodiments have been described in detail with reference to the drawings, a specific configuration is not limited to those described above, and various design modifications and the like can be made without departing from the scope of the present disclosure. All of or a part of the embodiments can be combined together as long as no inconsistencies are introduced.

(Supplement 1)

(Introduction) The revised work item for integrated access and backhaul enhancements (eIAB) in NR was approved at RAN #88e. Some of the main objectives are as follows:

Enhancements of Topology Adaptation:

- Specification of a procedure for inter-donor IAB-node migration to enhance robustness and load balancing, including enhancements to reduce signaling load.
- Specification of enhancements to reduce service interruption due to IAB-node migration and BH RLF recovery.
- Specification of enhancements of topology redundancy, including support for CP/UP separation.

Enhancements of Topology, Routing, and Transport:

- Specification of enhancements to improve topology-wide fairness, multi-hop latency, and congestion mitigation.

Regarding topology, routing, and transport enhancements, RAN2 #113-e pointed out the problems discussed in Rel-17, i.e., those marked with "IF" for fairness, "IL" for latency, or "IC" for congestion. At RAN2 #113bis-e, possible solutions were discussed, and only one agreement was reached. An extended LCG range for the IAB-MT. The size of the LCG and the extension of the BSR need further discussion.

Supplement 1 focuses on IF-4, IL-2, IL-3, IL-5, IL-6, IC-1, and IC-7 to discuss possible solutions to these problems.

Discussion

Topology-Wide Fairness

IF-4

IF-4 is defined as follows:

- IF-4: the IAB node cannot provide more resources to a BH RLC channel that aggregates more bearers and/or carries bearers with higher load per bearer (in other words, the IAB node cannot provide more resources to the BH RLC channel with higher aggregate load).

According to the list, possible solutions to IF-4 are as follows:

- F1: the CU configures the IAB node with additional information.
- F1-1: concerning the number of bearers within a specific BH RLC channel (e.g., actual number, average number).
- F1-2: concerning the QoS of the bearers in the specific BH RLC channel.
- F2: additional information is added to the BAP header.
- F2-1: bearer ID
- F2-2: the bearer ID and hop count of a specific path
- F2-3: the number of UE DRBs in a specific BAP packet The F1 solutions are configured only once, for example, the F1 solutions are provided with a routing configuration. Therefore, the F1 solutions are simple solutions that require less overhead and enable better "per RLC channel" scheduling. However, these solutions cannot be used for "per-packet" prioritization of DL scheduling.

The F2 solutions are added to each BAP header, allowing "per-packet" scheduling to be performed. However, clearly these solutions require more overhead for each BAP PDU than the F1 solutions.

For improved fairness, "per-packet" scheduling is superior to "per-RLC channel" scheduling from a technical point of view. These scheduling operations can be executed by a DL scheduler of the gNB (or IAB-DU). On the other hand, in the UL, the LCP basically provides scheduling "on a per-RLC channel basis". In this sense, in consideration of increased overhead in all BAP PDUs in the DL and UL, "per-packet" scheduling need not necessarily be performed only in the DL. Therefore, a simple solution, specifically, the F1 solution is more suitable for improving the topology-wide fairness in Rel-17.

Proposal 1: RAN2 needs to agree that the IAB donor configures the IAB node using the number of bearers mapped to each BH RLC channel and the QoS of these bearers. In other words, F1-1 and F1-2 are used to resolve IF-4.

Multi-Hop Latency

IL-2

IL-2 is defined as follows.

- IL-2: Due to the current (Rel-16) limitation on the number of LCGs, an IAB node may need to report the joint buffer status of LCHs with significantly different QoS requirements.

Possible solutions to IL-2 are as follows.

- L4: A new operation or function is specified for the IAB node.
- L4-3: The number of LCGs of the IAB-MT is increased.

At RAN2 #113bis-e, RAN2 "agreed to extend the LCG range of the IAB-MT. The size of the LCG and the extension of the BSR need further consideration." According to current specifications, the current LCG space is 8 (in other words, the maxLCG ID is 7), and this is common to the UE and the IAB-MT. For the UE, the current LCH ID space is 32 (in other words, maxLC-ID). For the IAB-MT, the maximum number of BH LCH IDs (in other words, maxLC-ID-Iab-r16) is 65,855, but the BH LCH ID space (in other words, BH-RLC channel ID-r16) is 65,536 (16 bits). When the same ratio is applied to the UE (in other words, LCG: LCH=1:4), 16,384 LCGs (14 bits) may be required for the IAB-MT. This is certainly feasible, but the size may need to be slightly increased for addition to the MAC CE. Some companies proposed extending the LCG space to at least 16 (4 bits) or 256 (8 bits). Therefore, RAN2 needs to study what is optimum for the extended LCG space.

Proposal 2: RAN2 needs to discuss the optimal maximum number for the extended LCG space: 16 (4 bits), 256 (8 bits), 16384 (14 bits), and even 65,536 (16 bits).

IL-3

IL-3 is defined as follows.

- IL-3: Calculation of the buffer size of the pre-emptive BSR depends on the implementation in Rel-16 and may thus vary from vendor to vendor.

Possible solutions to IL-3 are as follows.

- L4: A new operation or function is specified for the IAB node.
- L4-1: Calculation of the buffer size of the pre-emptive BSR is specified.

For the known BSR, calculation of the buffer size is clearly specified. This is based on data available in the MAC, RLC and PDCP. In the RLC and PDCP, the procedure of calculating the data amount is specified in each specification. In Rel-16, these mechanisms are reused for calculation of the data amount of the pre-emptive BSR of the IAB-MT.

However, the IAB node includes a BAP layer instead of the PDCP, and the BAP specification does not involve the calculation of the data amount. Accordingly, according to the current specifications, an insufficient amount of data is available for transmission. For better scheduling of topology-wide fairness, a more accurate buffer size needs to be reported in the legacy BSR.

Observation 1: No procedure is available for data that can be transmitted in the BAP, and thus, the legacy BSR and the pre-emptive BSR are inaccurate.

According to Rel-16, calculation of the buffer size of the pre-emptive BSR is highly dependent on the implementation of the IAB-DU. However, as the specification points out that "a buffer size field specifies the total amount of data expected to reach the IAB-MT of the node for which the pre-emptive BSR is triggered, and does not include the amount of data currently available at the IAB-MT", some IAB nodes may report, in the pre-emptive BSR, a buffer size larger than that actually reaches the IAB-MT. Configuring the same principle between the child node and the parent node may be difficult. For example, multi-vendor deployment leads to inefficient radio resource allocation and scheduling delays at the parent node and unfair resource requests among the IAB-MTs. An IAB node that is configured to have dual connectivity is likely to be more ambiguous. Therefore, calculation of the buffer size of the pre-emptive BSR needs to be more accurately specified. A problem is that calculation of the buffer size is not specified for the IAB-DU. In other words, no specification is available for data buffered on the reception side (MAC and RLC) of the IAB-DU.

Observation 2: No procedure is available for the data buffered in the MAC and RLC receivers of the IAB-DU. Accordingly, the data amount reported in the pre-emptive BSR in Rel-16 depends on the implementation of the IAB-DU.

Proposal 3: RAN2 needs to agree to specify the calculation of buffer size of the pre-emptive BSR (and possibly the legacy BSR). In other words, L4-1 is used to resolve IL-3.

Another problem is that when to trigger the pre-emptive BSR is unclear from the point of view of the parent node. In the MAC specification, two conditions are defined as follows. This means that the trigger condition depends on the implementation of the IAB-MT in Rel-16. Since the parent node cannot accurately predict when the data can actually be transmitted, an inappropriate UL grant is generated.

In other words, occurrence of any of the following events may trigger the pre-emptive BSR for a particular case of the IAB-MT.

The UL grant is provided to the child IAB node or UE.

The BSR is received from the child IAB node or the UE.

One simple solution may be to provide the IAB node with configuration of whether to trigger the pre-emptive BSR at the time of UL grant transmission or BSR reception. Configuration by the IAB donor is easy, but the pre-emptive BSR is actually used in the IAB-DU of the parent node, in other words, in the scheduler. Therefore, at this point, whether the trigger condition has been configured by the IAB donor or indicated by the parent IAB node needs to be further studied.

Proposal 4: RAN2 needs to agree that the trigger used for the pre-emptive BSR is configured by the IAB node. Whether the configuration is performed by the IAB donor or by the parent IAB node of the IAB donor needs to be further studied.

IL-5 and IL-6

IL-5 was specified as follows:

IL-5: The CU cannot place a bearer with a low PDB on a route with low congestion risk (high resource efficiency) or an RLF-free route.

Possible solutions to IL-5 are as follows.

L3: Additional signaling is introduced into the CU from the IAB node.

L3-1: The buffer/link status of the IAB node is shared with the CU.

L3-2: Latency measurements of individual hops in each BH RLC channel are shared with the CU.

L4: A new operation or function is specified for the IAB node.

L4-2: Local rerouting is permitted for a purpose other than RLF (e.g., based on the latency of an outgoing link).

F4: Additional signaling is introduced into the CU from the IAB node.

F4-1: A solution related to load information for each BH RLC channel.

F4-2: A solution related to latency of each hop in the individual link and packet loss in each hop.

IL-6 was specified as follows.

IL-6: The CU cannot configure routing based on actual (real-time) latency in each BH RLC channel.

Possible solutions to IL-6 are as follows.

L3: Additional signaling is introduced into the CU from the IAB node.

L3-2: Latency measurements of individual hops in each BH RLC channel are shared with the CU.

F4: Additional signaling is introduced into the CU from the IAB node.

F4-2: A solution related to latency of each hop in the individual link and packet loss in each hop.

L4: A new operation or function is specified for the IAB node.

L4-2: Local rerouting is permitted for a purpose other than RLF (e.g., based on the latency of an outgoing link).

The possible solutions to IL-5 and IL-6 may be common in additional signaling from the IAB node to the IAB donor, in other words, common to L3 and L4, and can be considered as a kind of MDT and/or SON procedure because the solutions enable unified optimization.

Regarding L3-1, it may be considered that the current specification allows the IAB-node to share some degree of buffer/link status with the IAB-donor, e.g., by RESOURCE STATUS UPDATE in F1-AP and/or the measurement reporting framework in RRC Accordingly, the additional information that needs to be reported to the CU is unknown.

The solutions to L3-2 and F4-2 can be generally used for both IL-5 and IL-6 and can be considered the same in terms of latency measurements. For the existing L2 measurement, "UL PDCP packet average latency per DRB per UE" is designated. However, clearly the PDCP packet average latency cannot be applied to the IAB node. Accordingly, new L2 measurements are expected to be required for the BAP layer.

Proposal 5: RAN2 needs to agree that the IAB node reports the results of latency measurements per hop to the IAB donor. In other words, L3-2 is used to resolve IL-5 and IL-6.

Regarding L4-2, RAN2 already agreed that "Type-2 RLF indication may be used to trigger local rerouting" and "Local rerouting can be triggered by indication of hop-by-hop flow control". Therefore, there is no need to further discuss this issue under this agenda item, i.e., the details of local rerouting can be discussed under the other agenda item for topology adaptation enhancements.

Observation 3: Another purpose, specifically, the local rerouting for L4-2, will be discussed in connection with the enhanced topology adaptation.

Congestion Mitigation

IC-1 and IC-7

IC-1 and IC-7 were annotated and designated as follows:

R2 concluded that the companies take sufficient interest to address the following two problems.

IC-1: Long-term downstream congestion on a single link cannot be mitigated using existing Rel-16 DL HbH flow control mechanisms without relying on packet dropping.

IC-7: The CU (which is not aware of the local congestion state) cannot update the routing path that is congested.

IC-1 and CI-7 are both associated with RAN3. RAN3 seems to be addressing this issue, and thus it is currently unclear to what extent RAN2 addresses this issue.

RAN3 discussed congestion indication and agreed as follows.

The CP-based congestion indication may include the following reports:

Per BAP routing ID, and/or

Per child node link, and/or

BH RLC CH ID (Down selection requires further study).

CP-based congestion indication reuses an F1APGNB-DU status indication procedure.

The CP-based congestion indication is related to DL congestion.

For the UP-based approach for IAB congestion mitigation, consider two following options.

No functional extension.

Packet marking based approach

The IAB donor can be assumed to avoid, upon receiving a congestion indication from the IAB node, a path on which congestion may occur as implied in the RAN2 agreement described above. Several methods are available that address this problem. Specifically, the IAB donor updates the routing configuration or indicates the local rerouting. In the latter case, RAN2 may be involved in the usage of the congestion indication. In either case, RAN2 needs to make determination as RAN3 progresses.

Observation 4: RAN2 may be involved in what action the IAB donor takes due to a congestion indication after RAN3 is aware of the details.

Supplement 2

Introduction

The revised work item for integrated access and backhaul enhancements (eIAB) in NR was approved at RAN #88e. Some of the purposes thereof are as follows.

Enhancements of Topology Adaptation:

Specification of a procedure for inter-donor IAB-node migration to enhance robustness and load balancing, including enhancements to reduce signaling load.

Specification of enhancements to reduce service interruption due to IAB-node migration and BHRLF recovery.

Specification of enhancements of topology redundancy, including support for CP/UP separation.

Enhancements of Topology, Routing, and Transport:

Specification of enhancements to improve topology-wide fairness, multi-hop latency, and congestion mitigation.

In addition to the current agreements, Supplement 2 discusses various topics of the enhanced topology adaptation in Rel-17 eIAB. Specifically, Supplement 2 discusses enhancements of the BH RLF Indication, enhancements of the conditional handover, and enhancements of the local rerouting.

Discussion

Enhancements of BH RLF Indication

In the email discussion in Rel-16, four types of BH RLF notifications were discussed as illustrated in FIG. 22.

Finally, only the Type4 "recovery failure" was designated as the BH RLF indication in Rel-16. Thus, the child IAB-MT can recognize an RLF on the BH link of the parent node and start the RLF recovery procedure.

Observation 1: only the Type4 "recovery failure" was designated as the BH RLF indication in Rel-16.

For the enhancements in Rel-17, RAN2 agreed to introduce Type2 "attempting to recover" and Type3 "BH link recovered". However, the detailed operation of the IAB node needs to be further studied.

RAN2 #113-e:

RAN2 supporting the Type2/3 RLF indication (details need to be further studied). The Type2 RLF Indication can be used to trigger the local rerouting. The Type2 RLF Indication may be used to trigger deactivation of the IAB supported in the SIB. The Type2 RLF Indication may be used to trigger deactivation or reduction of SR and/or BSR transmission.

RAN2 #113bis-e:

Further study is needed if any other CHO execution condition is needed (e.g., whether the Type2 RLF Indication can be used as a trigger).

One of the issues being further studied is whether/how to specify actions related to three possible use cases of the new BHR LF indication on which RAN2 has already agreed.

For triggering of the local rerouting, a BH RLF occurs in the UL from the point of view of the IAB node receiving the Type2 BH RLF Indication, and thus the trigger needs to enable upstream local rerouting, in other words, switching of the UL path. In other words, the IAB node receiving the Type2 BH RLF Indication can maintain a good BH link with downstream nodes, downstream local rerouting is independent of the Type2 BH RLF Indication. Therefore, the triggering of local rerouting can be regarded as an operation of the IAB-MT that needs to be clearly specified.

Proposal 1: RAN2 needs to agree to specify that upon receiving the Type2 BH RLF Indication from the parent node, the IAB-MT triggers the local rerouting on the upstream path.

Proposal 2: RAN2 needs to agree to specify that upon receiving the Type3 BH RLF Indication from the parent node, the IAB-MT stops the local rerouting on the upstream path, in other words, returns to the configured "normal" routing.

The deactivation of the IAB support IE in the SIB1 can be regarded as an operation of the IAB-DU which has been widely considered until the implementation in Rel-16. Therefore, specification only at stage 2 is probably sufficient. In particular, when an alternative path to the donor is still present, the IAB-DU can be assumed not to remove the IAB-Support IE from the SIB1. This needs to be clarified when operations are specified.

Proposal 3: RAN2 needs to study whether to remove the IAB-Support IE from the SIB1 when the IAB-DU receives the Type2 BH RLF Indication only at stage 2 and no alternative path to the IAB donor is present.

According to the RAN2 agreement described above, regardless of whether Proposal 3 can be agreed on, the IAB-MT does not start establishing connection to the parent node when the IAB-Support IE is not present in the SIB1. One question is whether the UE is allowed access to the cell (in other words, the parent node) even while the parent node is in a BH RLF state. This finally has a negative impact on the user because the RRC setup request cannot reach the CU, in other words, the donor. To avoid this, the cell has an option to prohibit UE access, stop SSB transmission, or broadcast the Type2 BH RLF indication via the SIB1. As in Proposal 3, when the IAB node includes an alternative route to the donor, the IAB support IE need not be removed from the SIB1.

Proposal 4: RAN2 needs to study whether to prohibit UE access in addition to IAB-MT access when the IAB-DU receives the Type2 BH RLF Indication and no alternative route to the IAB donor is present.

Deactivation or reduction of the SR and/or BSR transmission may be considered as an operation of the IAB-MT and thus needs to be clearly specified. With regard to the deactivation or reduction, "deactivation" may be simpler in terms of the specifications. However, the SR and/or BSR can be transmitted only after reception of the Type3, leading to a possible latency of scheduling. On the other hand, the "reduction" may cause unwanted interference but may allow scheduling to be resumed immediately after the BH link is recovered. Therefore, the RAN2 needs to discuss whether to support "deactivation", "reduction", or both of SRs and/or BSRs. When both are supported, this needs to be configurable by the IAB donor. Further, when the "reduction" is supported, it is unclear how the reduction of SRs and/or BSRs needs to be processed. The concept of the prohibition timer may be reused, but further studies are needed at this time.

Proposal 5: RAN2 needs to agree to specify that upon receiving the Type2 BH RLF Indication from the parent node, the IAB-MT deactivates or reduces the SR and/or BSR transmission.

Proposal 6: RAN2 needs to agree to specify that upon receiving the Type3 BH RLF Indication from the parent node, the IAB-MT can resume the normal procedure of SR and/or BSR transmission.

Proposal 7: RAN2 needs to study whether to support "deactivation" or "reduction" or both "deactivation" and "reduction" (in other words, configurable) of the SR and/or BSR when the Type2 BH RLF Indication is received from the parent node.

Another of the issues being further studied is whether the CHO is triggered by reception of the Type2 BH RLF Indication. With the Type2 BH RLF Indication transmitted, the parent node has experienced a BH RLF and is attempting to recover the BH link. This, of course, means that the IAB node fails to communicate with the donor. When the IAB node is configured with dual connectivity, execution of the local rerouting between the MCG and the SCG as in Proposal 1 can be selected.

However, an IAB node with only one connection can do nothing and needs to wait for either BH recovery of the parent node or reception of a Type4 BH RLF Indication. Obviously, that causes long-term service interruption and adverse effects on users. Therefore, the IAB node needs an option to trigger the CHO when receiving the Type2 BH RLF Indication. Further, as further optimization, it is worth considering whether the IAB node needs to cancel the CHO execution upon receiving the Type3 BH RLF Indication before actually executing the CHO.

Proposal 8: RAN2 needs to agree to specify that the IAB-MT triggers the CHO upon receiving the Type2 BH RLF Indication from the parent node.

Proposal 9: RAN2 needs to consider whether the IAB-MT cancels the CHO execution (if possible) upon receiving the Type3 BH RLF Indication from the parent node.

When both Proposal 1 and Proposal 8 can be agreed on, in other words, when the IAB node is simultaneously configured with the dual connectivity, local rerouting, and CHO, the IAB node can select to trigger the local rerouting or CHO upon receiving the Type2 BH Indication. For example, the local rerouting in accordance with the reception of the Type2 helps to avoid service interruption, while the CHO in accordance with the reception of the Type2 is suitable for the long-term/topology-wide performance. The local rerouting and CHO are triggered by the condition other than the reception of the Type2 and are thus assumed to be primarily configured for various purposes such as robustness of an event A3 handover.

In this case, several options are as follows. Either the implementation of the IAB node or the configuration of the IAB donor may be employed. Considering that the donor is a node that manages the topology-wide goal, the donor needs to be able to control the performance of the topology. Accordingly, the selection of the local rerouting or CHO in accordance with the reception of the Type2 needs to be configurable by the donor rather than being left to the implementation of the IAB node.

Proposal 10: When both Proposal 1 and Proposal 8 can be agreed on, RAN2 needs to further agree that the IAB donor can configure the IAB node to trigger the local rerouting or CHO due to the reception of the Type2 BH RLF Indication.

How to implement a new BH RLF indication in the specifications needs to be described. The Type2 and Type3 BH RLF Indications may be simple to send via the BAP control PDU as is the case with the Type4 BH RLF Indication in Rel-16. However, as in the case of Proposal 3 described above, the UE fails to receive the BAP control PDU and thus includes no BAP layer. Therefore, these BH RLF Indications may be broadcast via the SIB1, and the SIB1 may be encoded by the DU. Therefore, RAN2 needs to study which of the BAP control PDU or the SIB1 the BH RLF Indications are transmitted via.

Proposal 11: RAN2 needs to discuss which of the BAP control PDU or the SIB1 the Type2 and Type3 BH RLF Indications are transmitted via.

Enhancements for Conditional Handover

The conditional handover (CHO) was introduced into Rel-16 to improve mobility robustness.

The CHO can be used for the specified Rel-16 IAB. RAN2 #113-e and RAN2 #113-e reached the following agreement. Therefore, it is worth studying the CHO enhancements of eIAB in addition to the Rel-16 CHO.

RAN2 #113-e:

RAN2 discusses the CHO and begins with discussion of the CHO within the donor until RAN3 proceeds with discussion of migration of the IAB node between the donors.

RAN2 confirms the intention that the CHO in Rel-16 is/can be used for the IAB-MT (whether a change is required needs further studies).

RAN2 assumes that the Rel-16 specifications are the baseline for configurations of a default route, IP addresses, and a target path for intra-donor CHO.

RAN2 #113bis-e:

The use examples of the CHO for the IAB-MT need to involve migration and RLF recovery. RAN2 requires a solution common to intra-CU/intra-DU CHO and intra-CU/inter-DU CHO. CHO event A3 and CHO event A5 can be applied to the IAB-MT.

Further study is needed if any other CHO execution condition is needed (e.g., whether the Type2 RLF Indication can be used as a trigger).

When Proposal 8 in the preceding section can be agreed on, there is no dependence on the CHO event A3/A5. However, a kind of "forced" trigger in accordance with the Type2 BH RLF Indication is used, and thus all CHO candidates (in other words, candidate cells) may be able to simultaneously trigger the CHO.

According to the current specification, "when a plurality of NR cells is triggered by execution of conditional reconfiguration, which NR cell is to be selected depends on the implementation of the UE. For example, the UE considers beams and beam quality to select one of the triggered cells for execution". This is mainly intended for the UE.

Observation 2: In the CHO in Rel-16, when a plurality of candidate cells trigger the CHO execution, which cell to select depends on the implementation of the UE.

For the IAB-MT, it is not always the best approach to select one of the triggered cells using the implementation of the IAB-MT depending on local radio quality. This is because the topology-wide goal may be effectively processed by the IAB donor as discussed in RAN2 #112-e. Therefore, RAN2 needs to study how the CHO execution under the control of the IAB donor using an additional trigger condition functions as in Proposal 8. For example, the IAB donor can configure priority information associated with the CHO candidate in the CHO configuration. The IAB-MT needs to select the highest priority cell from all candidates for the triggered CHO that satisfy a certain radio quality (e.g., S criterion).

Proposal 12: RAN2 needs to consider whether the CHO execution under the control of the IAB donor is required as an additional enhancement when all candidate cells trigger the CHO upon reception of the Type2 BH RLF indication.

Enhancement of Local Rerouting

Rel-16 permits local rerouting only when a BH RLF occurs. For example, data buffering in a transmission part of a BAP entity depends on the implementation until an RLC-AM entity receives an acknowledgment response. In the case of a BH RLF, the transmission part of the BAP entity can reroute, to the alternative path, the BAP data PDU unacknowledged by the lower layers before the BH RLF.

RAN2 #113-e has achieved the following agreements relating to enhanced local rerouting.

The Type2 RLF Indication can be used to trigger the local rerouting.

The local rerouting can be triggered by indicating per-hop flow control. Details such as trigger information, trigger conditions, and the role of CU configuration need further studies.

RAN2 considers the inter-donor DU local rerouting to be within a certain range.

However, the details of local rerouting are still unclear, at least from a standpoint of configuration. As agreed on in Rel-17 #112-e, "RAN2 discusses the local rerouting in connection with how RAN2 can address the topology-wide goal, including advantages for determination of a central route." other cases in Rel-17 (in other words, not limited to the BH RLF). Therefore, the problems in Rel-16 need to be studied from a topology-wide objective point of view. Needless to say, the IAB donor is an entity that has complete knowledge about and complete control over the IAB topology and thus addresses the topology-wide objectives.

Observation 3: The IAB donor is the most appropriate entity to achieve the topology-wide objectives.

In Rel-16 local rerouting, selection of a path as an alternative path depends on the implementation of the IAB node as long as the destination is the same. This means that local rerouting is based on local determinations and cannot be controlled from a viewpoint of the IAB donor. This may not be consistent with the topology-wide objectives, especially when many local determinations occur and accumulate in the IAB topology.

Observation 4: In the Rel-16 local rerouting, which path is selected as the alternative path depends on the implementation of the IAB-MT.

Therefore, when the local rerouting is enhanced beyond the BH RLF case, the controllability of the IAB donor should become more important. The IAB donor can easily configure an alternative path. Thus, the IAB node needs to select an alternative path when performing local rerouting. Modeling of the alternative path needs further studies. For example, whether alternative paths have the same routing ID and the like need to be studied.

Proposal 13: RAN2 needs to study whether the IAB donor can provide a configuration of the IAB node using an alternative path in addition to the Rel-16 routing configuration.

As another aspect of the controllability of the IAB donor, RAN2 needs to consider that the IAB donor can recognize local rerouting and start/stop the local rerouting at the IAB node for coexistence of the local rerouting and topology-wide objectives. For example, the IAB donor may determine whether the topology-wide objectives are still achieved based on the knowledge of which IAB node is currently performing the local rerouting. When the IAB donor finds that the topology-wide objectives cannot be achieved, the IAB donor may instruct the IAB node to start/stop local rerouting, or the IAB donor may change the routing configuration for the entire IAB topology.

How to address the topology-wide objectives through the local rerouting depends on the implementation of the IAB donor, but the IAB donor may need information and controllability of the local determination of the IAB node.

Proposal 14: RAN2 needs to study whether the IAB node needs to notify the IAB donor when local rerouting is started/stopped.

Proposal 15: The RAN2 needs to discuss whether the IAB donor can instruct the IAB node to start/stop local rerouting.

The invention claimed is:

1. A communication control method used in a cellular communication system, the communication control method comprising:

- configuring, by a donor node, a first relay node using correspondence information representing a correspondence relationship that a specific respective hop count of a logical channel (LCH) is associated with each respective logical channel group (LCG), the first relay node being subordinate to the donor node;
- transmitting, by the first relay node, a buffer status report (BSR) to a second relay node being a parent node of the first relay node and subordinate to the donor node, based on the correspondence information; and
- transmitting, by the second relay node, an uplink grant (UL grant) to the first relay node, based on the correspondence information and the buffer status report.

2. The communication control method according to claim 1, further comprising:

transmitting, by the donor node, the correspondence information to the second relay node.

3. The communication control method according to claim 1, wherein the transmitting of the buffer status report comprises, by the first relay node, determining the logical channel group corresponding to the hop count of a packet received via the logical channel based on the correspondence information, and transmitting, to the second relay node, the buffer status report comprising a buffer size of the logical channel group.

4. A first relay node in a cellular communication system, the first relay node comprising:

a receiver configured to receive, from a donor node, correspondence information representing a correspondence relationship that a specific respective hop count of a logical channel (LCH) is associated with each respective logical channel group (LCG), wherein the first relay node is subordinate to the donor node; and a transmitter configured to transmit, to a second relay node being a parent node of the first relay node and subordinate to the donor node, a buffer status report (BSR) based on the correspondence information, wherein the receiver is further configured to receive, from the second relay node, an uplink grant (UL grant) based on the correspondence information and the buffer status report.

5. An apparatus configured to control a first relay node in a cellular communication system, the apparatus comprising a processor and a memory coupled to the processor, the processor configured to:

receive, from a donor node, correspondence information representing a correspondence relationship that a specific respective hop count of a logical channel (LCH) is associated with each respective logical channel group (LCG), wherein the first relay node is subordinate to the donor node;

transmit, to a second relay node being a parent node of the first relay node and subordinate to the donor node, a buffer status report (BSR) based on the correspondence information; and receive, from the second relay node, an uplink grant (UL grant) based on the correspondence information and the buffer status report.

* * * * *